United States Patent
Dai et al.

(10) Patent No.: US 11,853,144 B2
(45) Date of Patent: *Dec. 26, 2023

(54) SYSTEM, APPARATUS AND METHOD FOR GLOBALLY AWARE REACTIVE LOCAL POWER CONTROL IN A PROCESSOR

(71) Applicant: Intel Corporation, Santa Clara, CA (US)

(72) Inventors: Jianwei Dai, Portland, OR (US); David Pawlowski, Portland, OR (US); Adwait Purandare, Hillsboro, OR (US); Ankush Varma, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/664,083

(22) Filed: May 19, 2022

(65) Prior Publication Data

US 2023/0148150 A1   May 11, 2023

Related U.S. Application Data

(63) Continuation of application No. 16/691,873, filed on Nov. 22, 2019, now Pat. No. 11,366,506.

(51) Int. Cl.
*G06F 1/32* (2019.01)
*G06F 1/3234* (2019.01)
(Continued)

(52) U.S. Cl.
CPC ............ *G06F 1/3234* (2013.01); *G06F 1/324* (2013.01); *G06F 1/3206* (2013.01)

(58) Field of Classification Search
CPC ...... G06F 1/324; G06F 1/3243; G06F 1/3206; G06F 1/3237; G06F 1/329; Y02D 10/00
See application file for complete search history.

(56) References Cited

U.S. PATENT DOCUMENTS 5,163,153 A    11/1992   Cole et al.
5,522,087 A    5/1996    Hsiang
(Continued)

FOREIGN PATENT DOCUMENTS

EP    1 282 030 A1    5/2003

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Jaweed A Abbaszadeh
*Assistant Examiner* — Cheri L Harrington
(74) *Attorney, Agent, or Firm* — TROP, PRUNER & HU, P.C.

(57) ABSTRACT

In one embodiment, a processor includes a plurality of intellectual property (IP) circuits, each to execute instructions and including a local control circuit to enable the IP circuit to operate at a level above a local current budget for the IP circuit, unless the processor is undergoing a global violation. The processor may further include a power controller coupled to the plurality of IP circuits. The power controller may include a control circuit to receive request information from the plurality of IP circuits and, based at least in part on the request information, determine that the processor is undergoing the global violation when a global current budget is exceeded. Other embodiments are described and claimed.

20 Claims, 21 Drawing Sheets

(51) Int. Cl.
*G06F 1/324* (2019.01)
*G06F 1/3206* (2019.01)

(56) References Cited

U.S. PATENT DOCUMENTS

| | | | |
|---|---|---|---|
| 5,590,341 | A | 12/1996 | Matter |
| 5,621,250 | A | 4/1997 | Kim |
| 5,931,950 | A | 8/1999 | Hsu |
| 6,748,546 | B1 | 6/2004 | Mirov et al. |
| 6,792,392 | B1 | 9/2004 | Knight |
| 6,823,516 | B1 | 11/2004 | Cooper |
| 6,829,713 | B2 | 12/2004 | Cooper et al. |
| 6,996,728 | B2 | 2/2006 | Singh |
| 7,010,708 | B2 | 3/2006 | Ma |
| 7,043,649 | B2 | 5/2006 | Terrell |
| 7,093,147 | B2 | 8/2006 | Farkas et al. |
| 7,111,179 | B1 | 9/2006 | Girson et al. |
| 7,194,643 | B2 | 3/2007 | Gonzalez et al. |
| 7,272,730 | B1 | 9/2007 | Acquaviva et al. |
| 7,337,339 | B1 * | 2/2008 | Choquette ............ G06F 1/3287 713/320 |
| 7,412,615 | B2 | 8/2008 | Yokota et al. |
| 7,434,073 | B2 | 10/2008 | Magklis |
| 7,437,270 | B2 | 10/2008 | Song et al. |
| 7,454,632 | B2 | 11/2008 | Kardach et al. |
| 7,519,843 | B1 | 4/2009 | Buterbaugh |
| 7,529,956 | B2 | 5/2009 | Stufflebeam |
| 7,539,885 | B2 | 5/2009 | Ma |
| 7,730,340 | B2 | 6/2010 | Hu et al. |
| 7,861,102 | B1 | 12/2010 | Ranganathan |
| 9,063,727 | B2 | 6/2015 | Man |
| 9,235,254 | B2 | 12/2016 | Ananthakrishnan |
| 2001/0044909 | A1 | 11/2001 | Oh et al. |
| 2002/0194509 | A1 | 12/2002 | Plante et al. |
| 2003/0061383 | A1 | 3/2003 | Zilka |
| 2004/0064752 | A1 | 4/2004 | Kazachinsky et al. |
| 2004/0098560 | A1 | 5/2004 | Storvik et al. |
| 2004/0139356 | A1 | 7/2004 | Ma |
| 2004/0268166 | A1 | 12/2004 | Farkas et al. |
| 2005/0022038 | A1 | 1/2005 | Kaushik et al. |
| 2005/0033881 | A1 | 2/2005 | Yao |
| 2005/0132238 | A1 | 6/2005 | Nanja |
| 2006/0050670 | A1 | 3/2006 | Hillyard et al. |
| 2006/0053326 | A1 | 3/2006 | Naveh |
| 2006/0059286 | A1 | 3/2006 | Bertone et al. |
| 2006/0069936 | A1 | 3/2006 | Lint et al. |
| 2006/0117202 | A1 | 6/2006 | Magklis et al. |
| 2006/0184287 | A1 | 8/2006 | Belady et al. |
| 2007/0005995 | A1 | 1/2007 | Kardach et al. |
| 2007/0016817 | A1 | 1/2007 | Albonesi et al. |
| 2007/0079294 | A1 | 4/2007 | Knight |
| 2007/0106827 | A1 | 5/2007 | Boatright et al. |
| 2007/0156992 | A1 | 7/2007 | Jahagirdar |
| 2007/0214342 | A1 | 9/2007 | Newburn |
| 2007/0239398 | A1 | 10/2007 | Song et al. |
| 2007/0245163 | A1 | 10/2007 | Lu et al. |
| 2008/0028240 | A1 | 1/2008 | Arai et al. |
| 2008/0250260 | A1 | 10/2008 | Tomita |
| 2009/0006871 | A1 | 1/2009 | Liu et al. |
| 2009/0150695 | A1 | 6/2009 | Song et al. |
| 2009/0150696 | A1 | 6/2009 | Song et al. |
| 2009/0158061 | A1 | 6/2009 | Schmitz et al. |
| 2009/0158067 | A1 | 6/2009 | Bodas et al. |
| 2009/0172375 | A1 | 7/2009 | Rotem et al. |
| 2009/0172428 | A1 | 7/2009 | Lee |
| 2009/0235105 | A1 | 9/2009 | Branover et al. |
| 2010/0115309 | A1 | 5/2010 | Carvalho et al. |
| 2010/0146513 | A1 | 6/2010 | Song |
| 2010/0191997 | A1 | 7/2010 | Dodeja et al. |
| 2011/0145555 | A1 | 6/2011 | Nayar |
| 2011/0154090 | A1 | 6/2011 | Dixon et al. |
| 2012/0079290 | A1 | 3/2012 | Kumar |
| 2012/0079299 | A1 | 3/2012 | Cepulis |
| 2012/0110352 | A1 | 5/2012 | Branover |
| 2012/0117403 | A1 | 5/2012 | Bieswanger |
| 2012/0246506 | A1 | 9/2012 | Knight |
| 2013/0061064 | A1 | 3/2013 | Ananthakrishnan et al. |
| 2013/0080803 | A1 | 3/2013 | Ananthakrishnan et al. |
| 2013/0080804 | A1 | 3/2013 | Ananthakrishnan et al. |
| 2013/0111120 | A1 | 5/2013 | Ananthakrishnan et al. |
| 2013/0111121 | A1 | 5/2013 | Ananthakrishnan et al. |
| 2013/0111226 | A1 | 5/2013 | Ananthakrishnan et al. |
| 2013/0111236 | A1 | 5/2013 | Ananthakrishnan et al. |
| 2013/0138977 | A1 | 5/2013 | Herman |
| 2013/0159755 | A1 | 6/2013 | Presant |
| 2013/0246820 | A1 | 9/2013 | Branover |
| 2013/0346774 | A1 | 12/2013 | Bhandaru et al. |
| 2014/0052900 | A1 | 2/2014 | Dai |
| 2014/0068290 | A1 | 3/2014 | Bhandaru et al. |
| 2014/0195829 | A1 | 7/2014 | Bhandaru et al. |
| 2014/0208141 | A1 | 7/2014 | Bhandaru et al. |
| 2015/0177813 | A1 | 6/2015 | Bailey |
| 2016/0062447 | A1 | 3/2016 | Hsu |
| 2016/0179164 | A1 | 6/2016 | Park |
| 2016/0252942 | A1 | 9/2016 | Varma |
| 2016/0259392 | A1 | 9/2016 | Weissmann |
| 2016/0349828 | A1 | 12/2016 | Weissmann |
| 2017/0031431 | A1 | 2/2017 | Khatri |
| 2017/0285676 | A1 | 10/2017 | Sutton |
| 2017/0364132 | A1 | 12/2017 | Gendler |
| 2018/0004269 | A1 * | 1/2018 | Rosenzweig ......... G06F 1/3243 |
| 2019/0041969 | A1 | 2/2019 | Nge et al. |
| 2019/0042280 | A1 | 2/2019 | Shanbhogue et al. |
| 2019/0086982 | A1 | 3/2019 | Priyadarshi |
| 2019/0146567 | A1 * | 5/2019 | Kosonocky ........... G06F 1/3287 713/322 |
| 2019/0146569 | A1 | 5/2019 | Nge et al. |
| 2020/0050246 | A1 | 2/2020 | Karalnik |
| 2020/0133361 | A1 | 4/2020 | Jenne |
| 2020/0142465 | A1 | 5/2020 | Jenne |
| 2020/0249974 | A1 | 8/2020 | Sutton |
| 2020/0272217 | A1 | 8/2020 | Becker |
| 2021/0157378 | A1 * | 5/2021 | Guo ...................... G06F 1/324 |
| 2021/0208663 | A1 | 7/2021 | Cooper |

OTHER PUBLICATIONS

Intel Corporation, "Intel 64 and IA-32 Architectures Software Developer's Manual," vol. 3B: System Programming Guide, Part 2, Apr. 2016, Chapter 14 Power and Thermal Management (14.1-14.9.5), 39 pages.

Intel Technology Journal, "Power and Thermal Management in the Intel Core Duo Processor," May 15, 2006, pp. 109-122.

International Application No. PCT/US18/30517, filed May 1, 2018, entitled "Power Control Arbitration," by Intel Corporation.

U.S. Appl. No. 16/412,606, filed May 15, 2019, entitled "System, Apparatus And Method For Dynamically Controlling Current Consumption Of Processing Circuits Of A Processor," by Avinash N. Ananthakrishnan.

* cited by examiner

SYSTEM, APPARATUS AND METHOD FOR GLOBALLY AWARE REACTIVE LOCAL POWER CONTROL IN A PROCESSOR

CROSS REFERENCE TO RELATED APPLICATION

This is a continuation of U.S. application Ser. No. 16/691,873, filed Nov. 22, 2019, the content of which is hereby incorporated by reference.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

Figure 1:
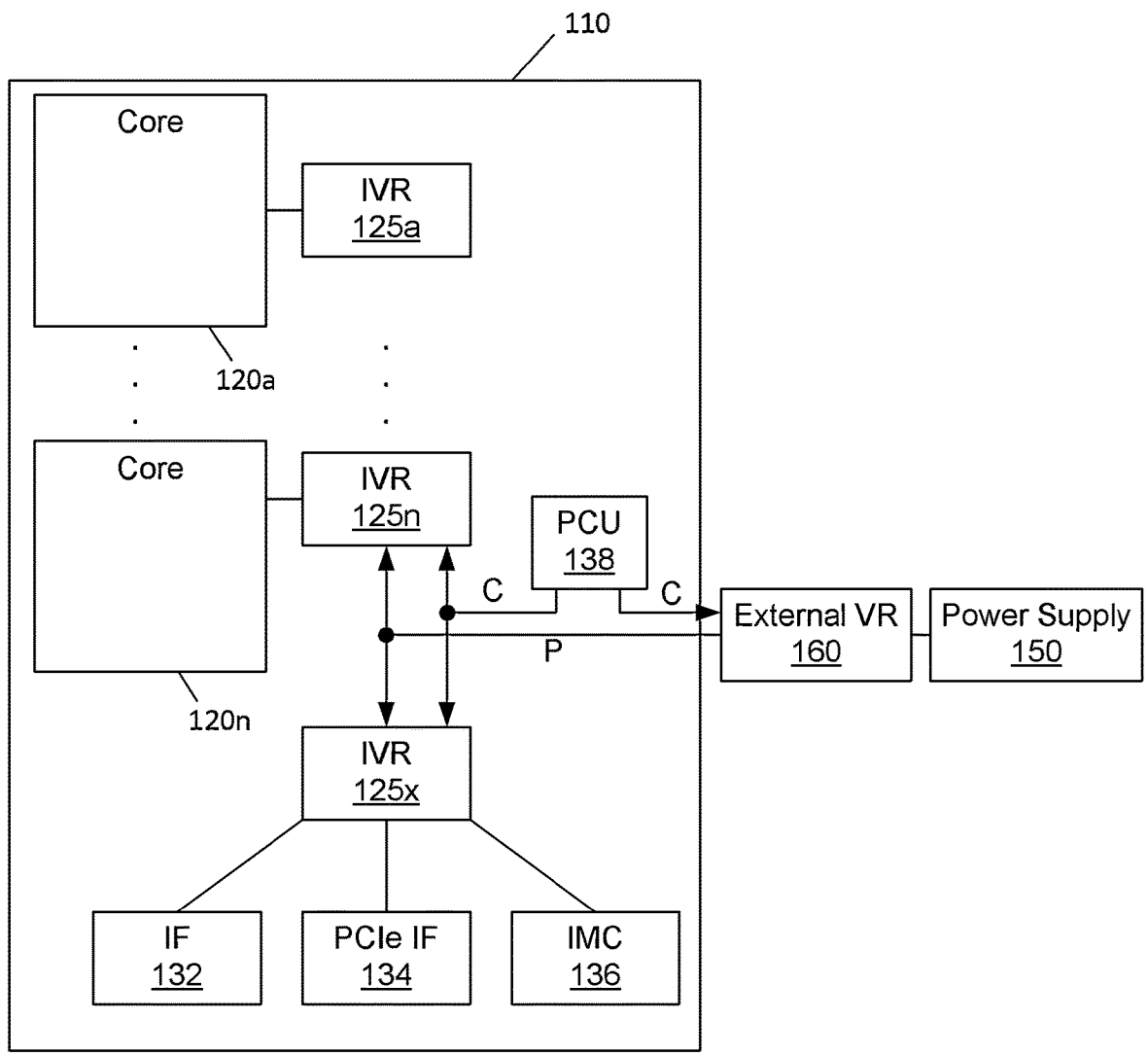
FIG. 1 is a block diagram of a portion of a system in accordance with an embodiment of the present invention.

In various embodiments, a processor is configured with a power controller that uses reactive techniques to enable the processor to operate in a constrained environment with better performance, by providing precision throttling of circuitry. More specifically, embodiments operate to isolate different intellectual property (IP) circuits such as cores or other processing units, so that offending IP circuits (e.g., operating above a given maximum current budget) can be identified and penalized while leaving other well-behaved IP circuits unaffected if desired. For example, in a multi-partition scenario (such as a system on chip (SoC) to execute multiple virtual machines (VMs)), no cross-partition throttling or cross-partition frequency loss occurs as a result of maximum current (IccMax) or power limit situations of another partition. In addition, by eliminating cross-IP interference, embodiments enable performance to be maximized in a processor undergoing a physical constraint such as a violation of a global budget (e.g., thermal, electrical or so forth), while aggressively reducing design guard bands.

In embodiments, both global status and local status are considered, and a given IP circuit is only throttled in response to both global and local violations. In contrast, other techniques suffer from being overly conservative when IP circuits are throttled when a local violation is detected, and/or when all IP circuits are throttled due to a global violation. With an embodiment, in a multi-partition scenario only cores that draw high current such that a partition violation occurs (in addition to a local violation) are throttled, without affecting cores in other partitions.

Embodiments also provide for per-partition control of electrical design power (EDP) and running average power limit (RAPL) control techniques. With this arrangement, assume an IP circuit in a first partition (e.g., Partition-0) starts running a high current workload, the per-partition EDP algorithm will reduce frequencies of cores only in Partition-0 without affecting IP circuits in other partitions. Thus, workload characteristics of one partition do not affect the performance of other partitions for IccMax or power limit reasons. In addition, current and power isolation may be ensured between different partitions in a SoC. Thus, when applied in a VM scenario, embodiments ensure that there is no cross-VM throttling or cross-VM frequency loss due to IccMax or power limit reasons, resulting in current and power isolation between VMs. And with separate partitions and local/global triggered control, a noisy neighbor problem of one high consuming VM causing constraints on another VM can be avoided.

Note that the examples and description detail the case where the response to a violation is to throttle only those IP circuits or groups of IP circuits that are exceeding their budget. It is also possible to employ other considerations on throttle determinations. One particular example is priority. In an embodiment, an SoC may be configured with a group of cores either dedicated to a high priority VM or controlled to execute a high priority workload. With an embodiment, there may be different budgets for different priorities, such that both priority and magnitude of current or power are considered in throttling determinations.

In one example operating scenario, assume 2 VMs are running on the same SoC. A first VM is scheduled to execute low power integer workloads while a second VM is scheduled to execute high power (e.g., vector) workloads. With partitioning and reactive throttling as described herein, the first VM may execute without frequency degradation or throttling, even where the second VM may be constrained due to violations of IccMax and/or power limits.

Thus with embodiments, unwanted cross-IP circuit interference may be avoided, along with avoiding local throttling in the absence of a global violation, and thus increase performance. In contrast, without an embodiment, certain IP circuits may be throttled too often. Note that it is possible in this case of excess throttling, the throttled IP circuits might request greater current budget. In turn, such request(s) could cause a reduction in current budget to all cores to ensure sufficient headroom for the requesting core. And thus without an embodiment, reduced performance may occur, which could cause certain workloads having higher priority to be impacted. With embodiments, techniques that determine an overall or global shared frequency ceiling can avoid an anomalous situation in which a single core requesting greater current budget could cause a frequency of all cores to be reduced.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores 120a-120n. In addition, each core may be associated with an integrated voltage regulator (IVR) 125a-125n which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator 125x. In one embodiment, interface 132 may be enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

Furthermore, while FIG. 1 shows an implementation in which PCU 138 is a separate processing engine (which may be implemented as a microcontroller), understand that in some cases in addition to or instead of a dedicated power controller, each core may include or be associated with a power control agent to more autonomously control power consumption independently. In some cases a hierarchical power management architecture may be provided, with PCU 138 in communication with corresponding power management agents associated with each of cores 120.

PCU 138 may include various control circuitry that is configured to determine information regarding a violation of one or more global allocations, e.g., of current, power or so forth. And, based at least in part on this information, local circuitry such as individual cores 120 may modulate throttling activity when a local violation of a local threshold is identified. In this way, control circuitry present within PCU 138 may provide control information and an indication of a global violation to local circuitry to cause the local circuitry to dynamically modulate its throttling behavior when a local violation is detected. As will be described herein, such modulation may include gating of local throttling or otherwise minimizing an impact of throttling activity.

While not shown for ease of illustration, understand that additional components may be present within processor 110 such as additional control circuitry, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. Embodiments described herein may enable dynamic changes to the guaranteed frequency of the P1 performance state, based on a variety of inputs and processor operating parameters. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
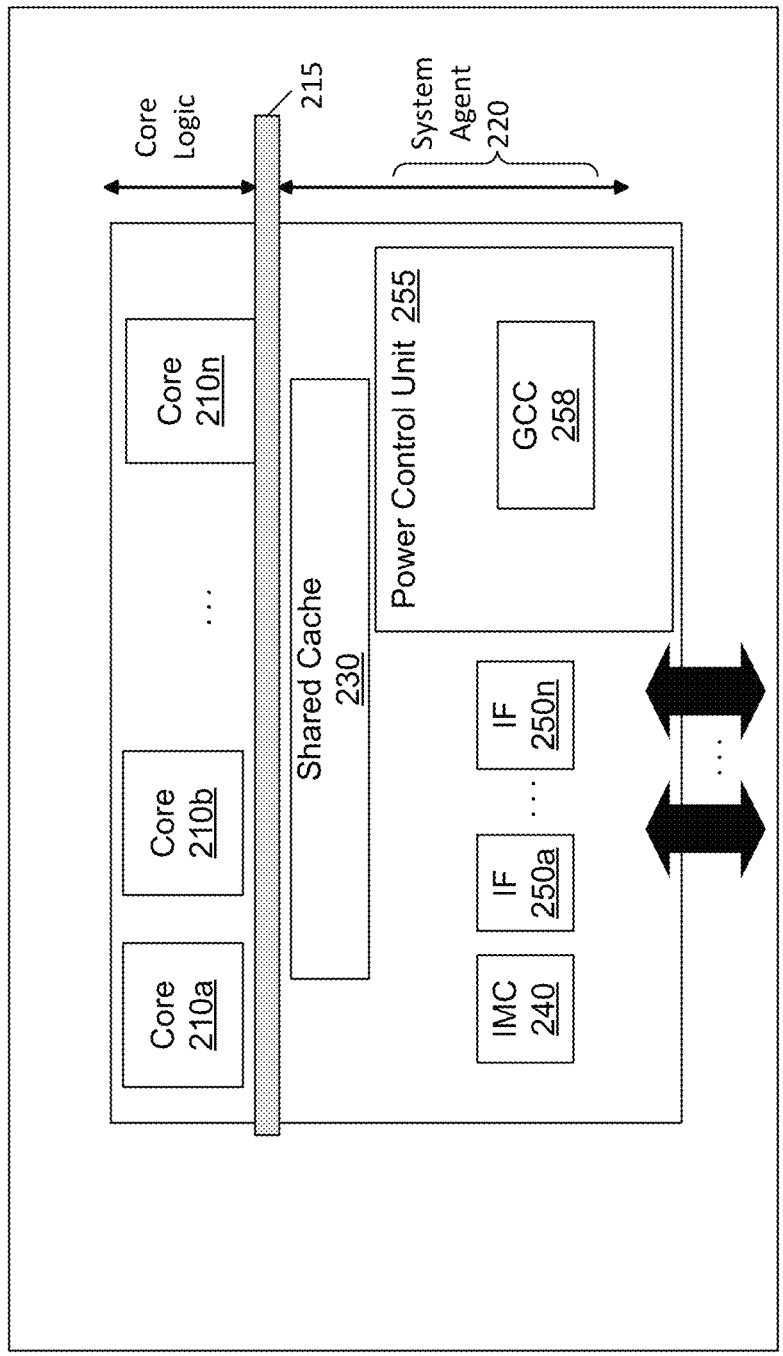
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. The various cores may be coupled via an interconnect 215 to a system agent 220 that includes various components. As seen, system agent 220 may include a shared cache 230 which may be a last level cache. In addition, the system agent may include an integrated memory controller 240 to communicate with a system memory (not shown in FIG. 2), e.g., via a memory bus. System agent 220 also includes various interfaces 250 and a power control unit 255, which may include logic to perform the power management techniques described herein. In the embodiment shown, power control unit 255 includes a global control circuit 258 that may dynamically determine presence of a global violation. In different implementations, this global violation may be made on a processor-wide basis, or may be indicated on a per-partition basis in embodiments incorporated in a multi-partition processor. When such a global violation is detected, global control circuit 258 may communicate a global violation to cores 210, which may modulate their local throttling behavior based at least in part on this indication of a global violation, as described further herein.

In addition, by interfaces $250a$-$250n$, connection can be made to various off-chip components such as peripheral devices, mass storage and so forth. While shown with this particular implementation in the embodiment of FIG. 2, the scope of the present invention is not limited in this regard.

Figure 3:
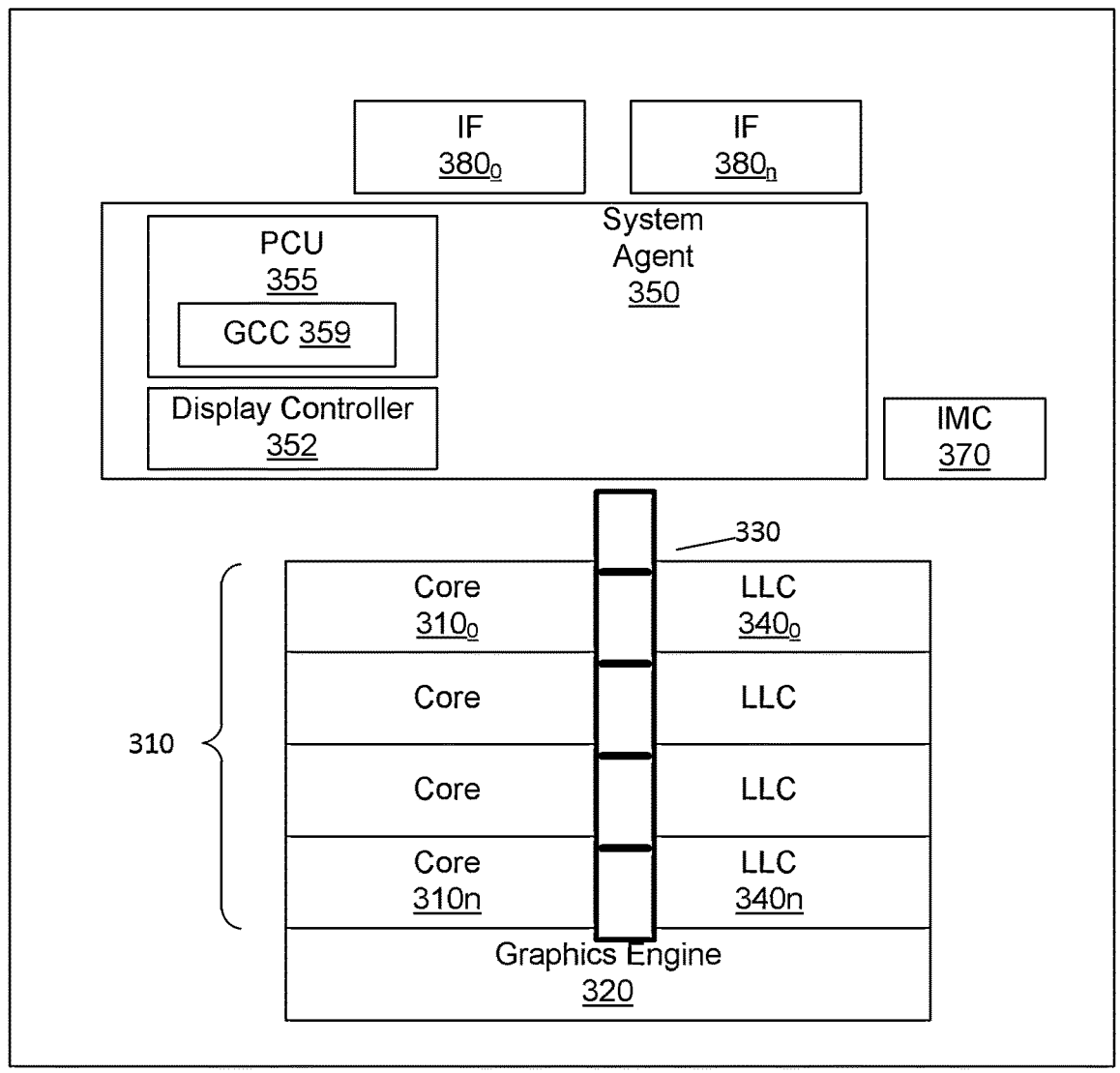
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core. Note that in a multiple partition processor, multiple domains may be included in a single partition, while in other implementations each domain may be considered its own partition.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform the power management techniques described herein. In the embodiment shown, power control unit 355 includes a global control circuit 359, which dynamically determines presence of a global violation and communicates an indication of the violation, e.g., to cores 310 and/or graphics engine 320. In turn, these local circuits may modulate their throttling activity based at least in part on the indication of a global violation, as described herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
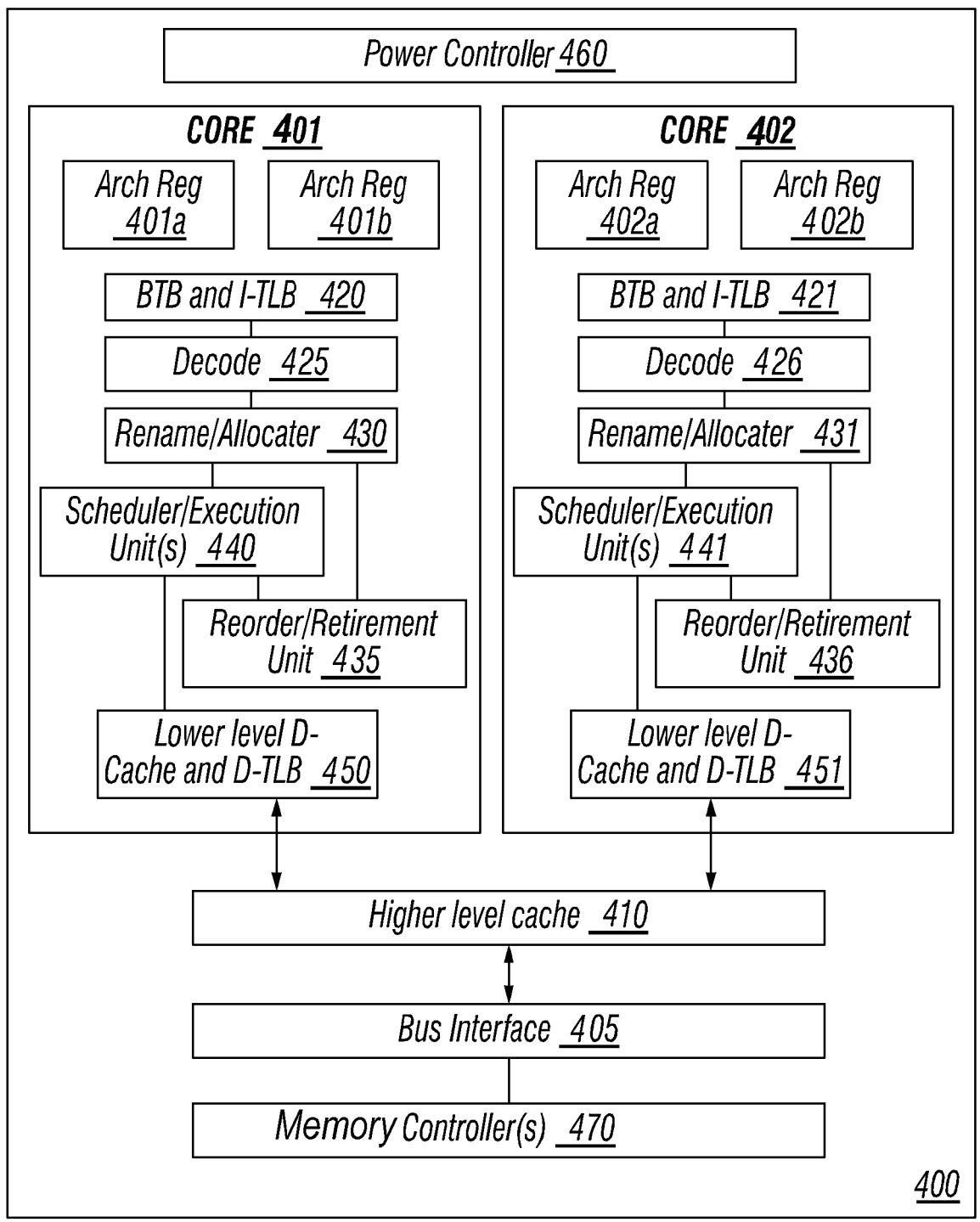
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
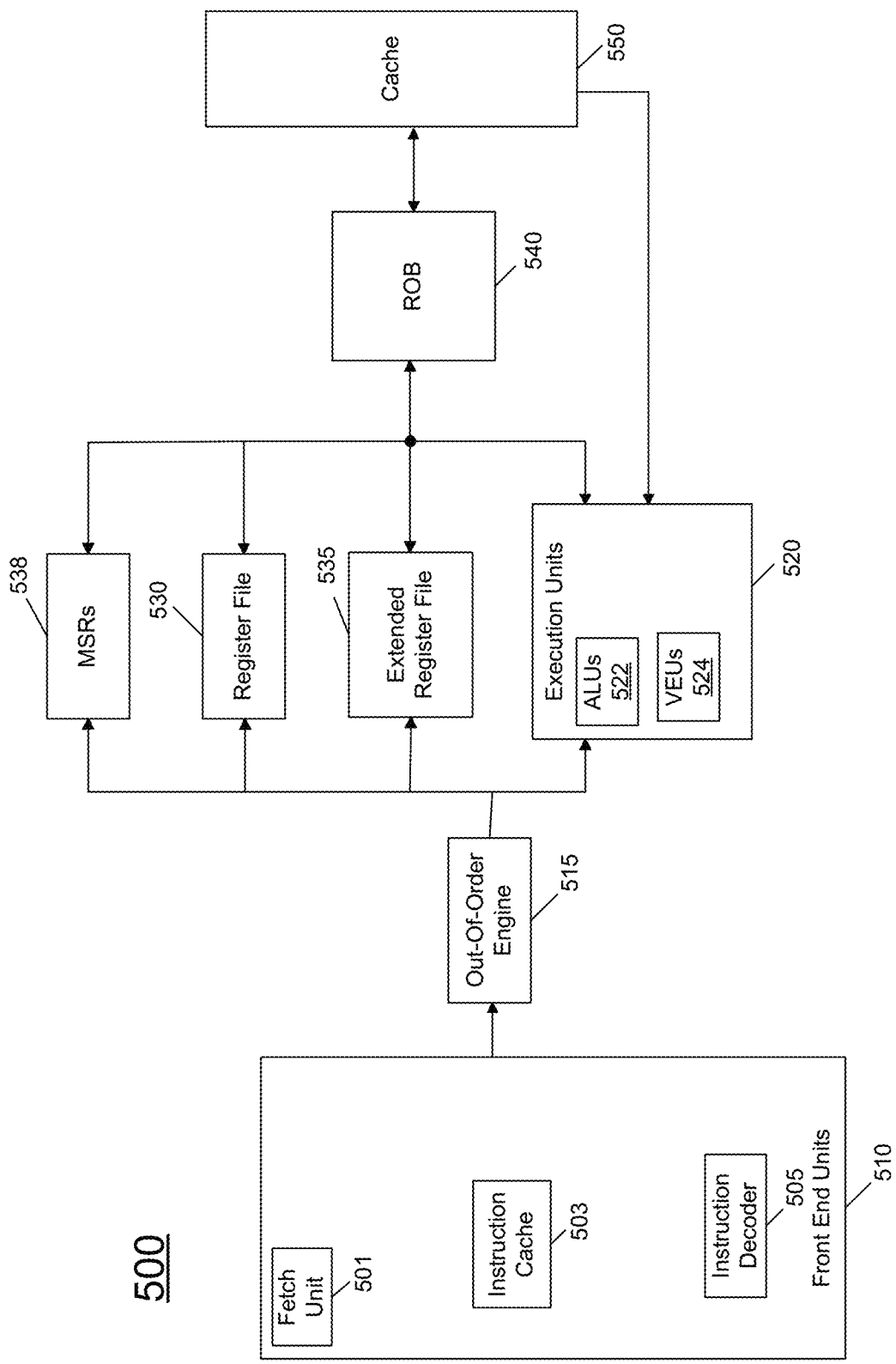
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register. For purposes of configuration, control, and additional operations, a set of machine specific registers (MSRs) 538 may also be present and accessible to various logic within core 500 (and external to the core).

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
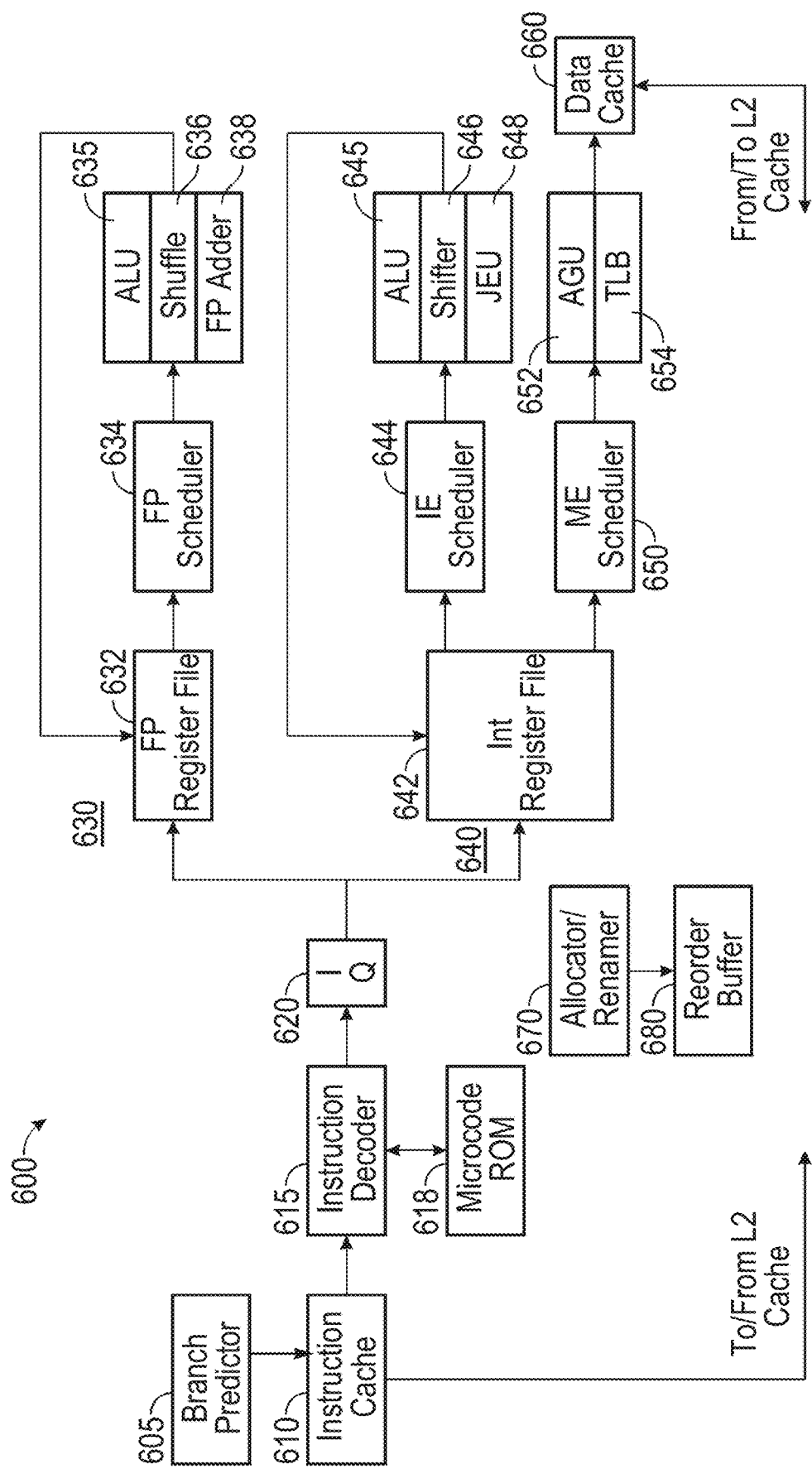
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit width such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
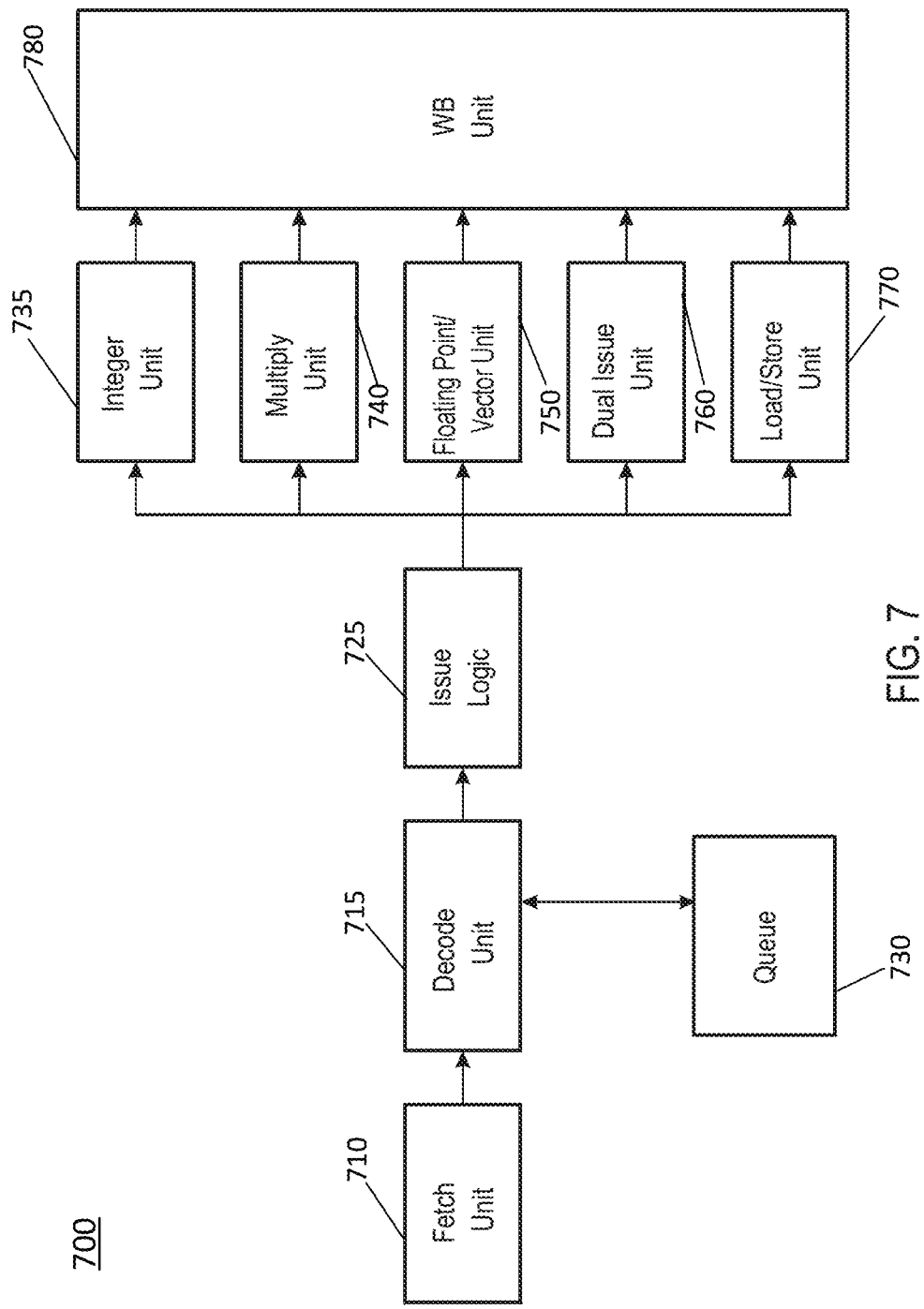
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
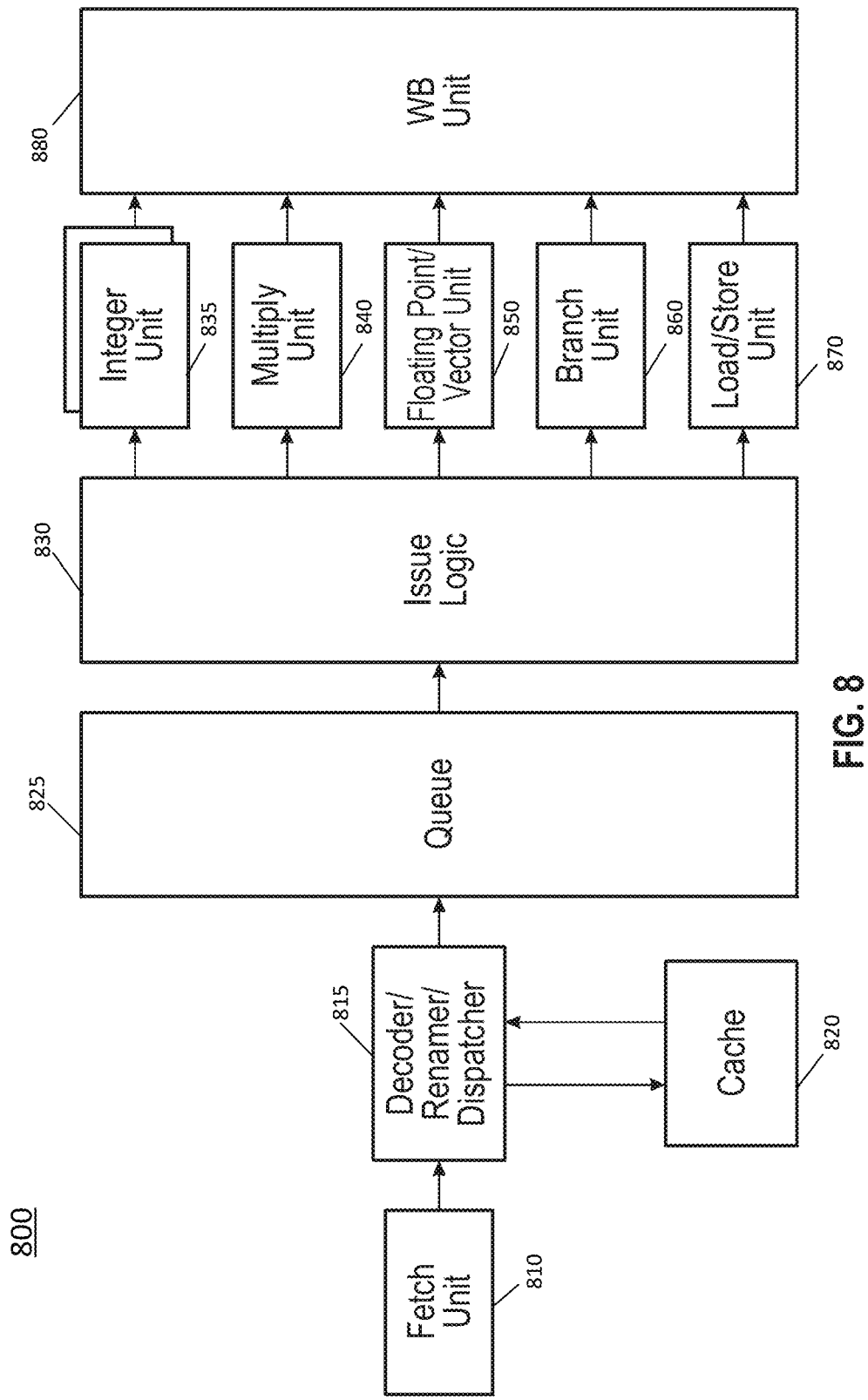
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
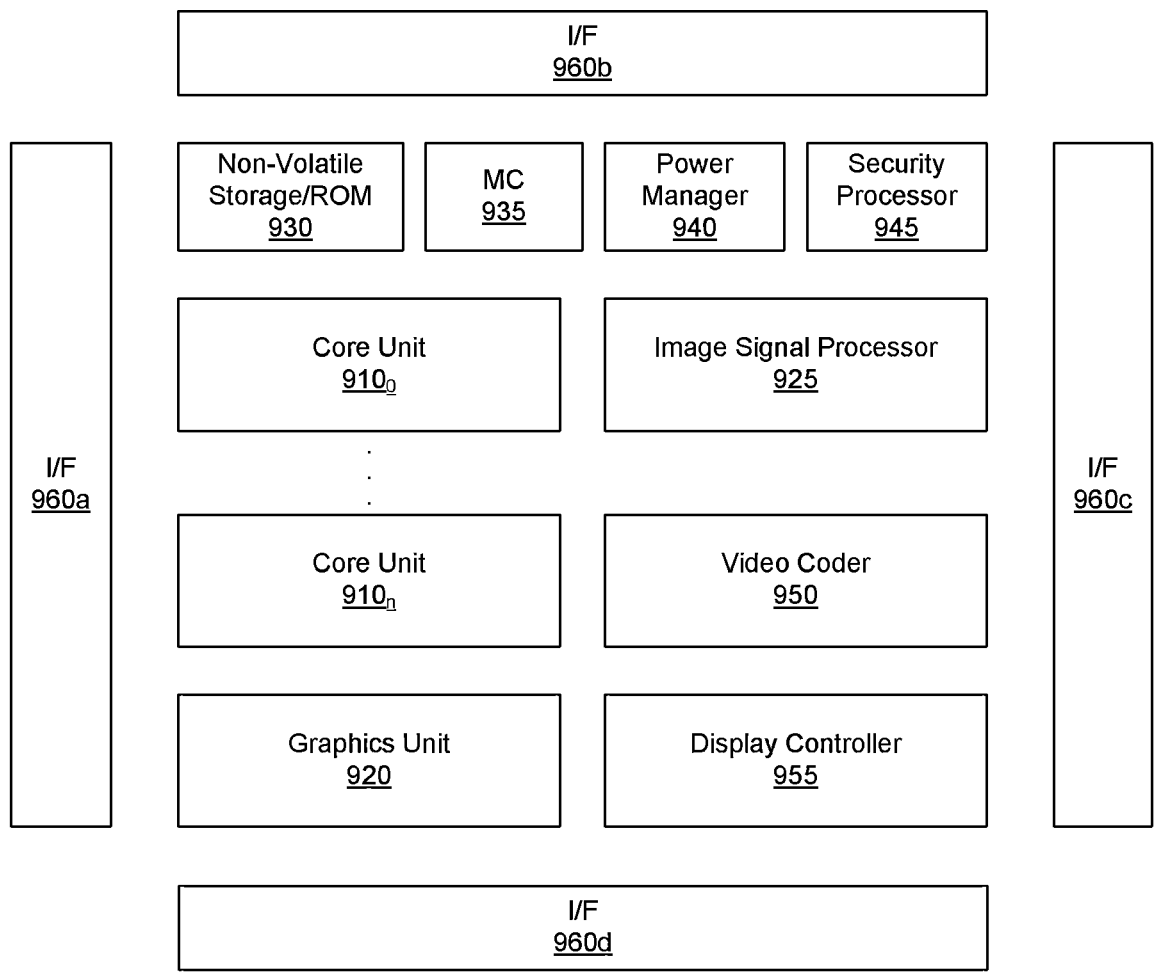
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif, or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device or connected device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
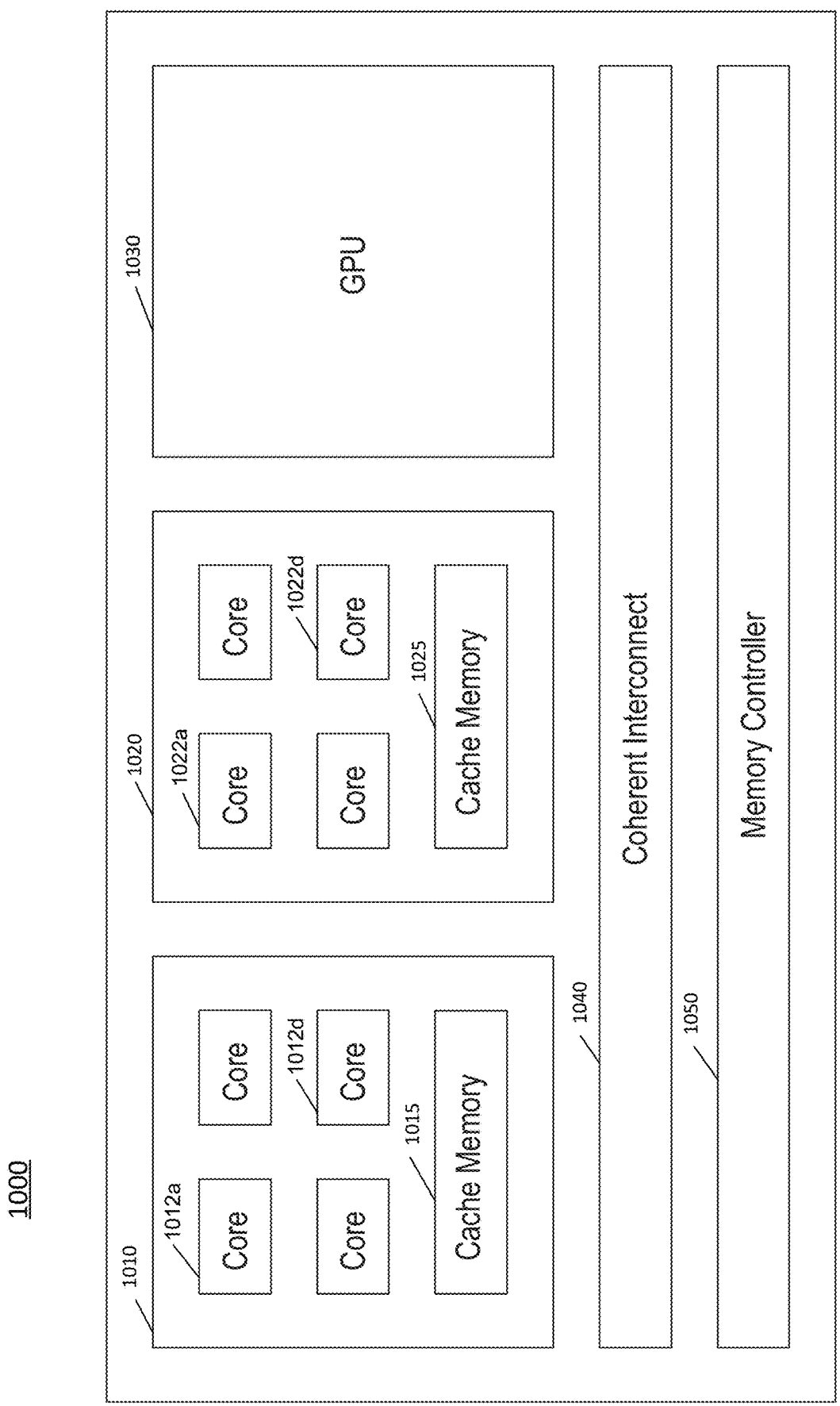
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel® and ARM cores may be implemented in a given SoC.

As seen in FIG. 10, SoC 1000 includes a first core domain 1010 having a plurality of first cores 1012$_0$-1012$_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores 1022$_0$-1022$_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
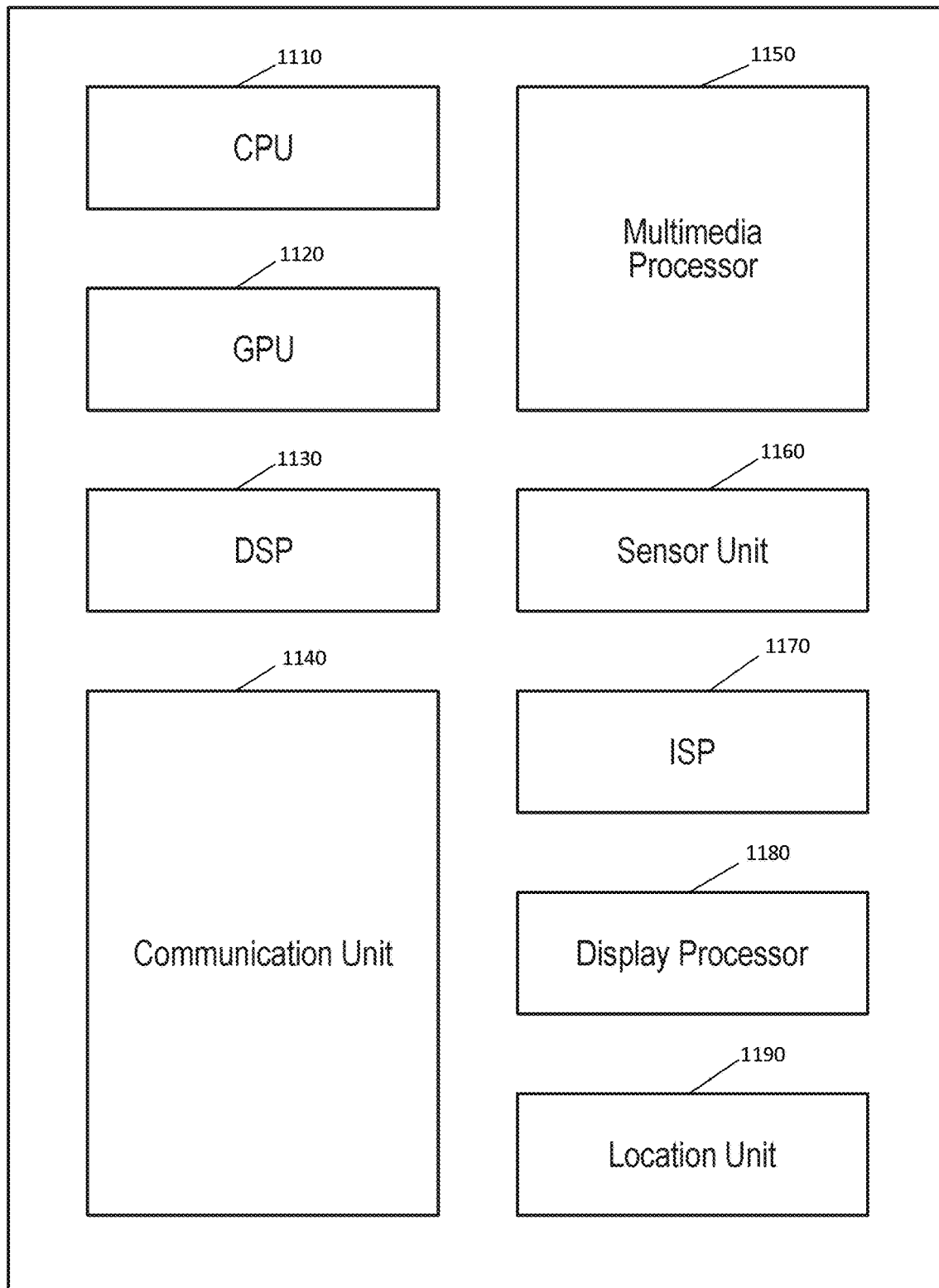
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™ IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver.

Understand that while shown with this particular set of components in the example of FIG. 11, many variations and alternatives are possible.

Figure 12:
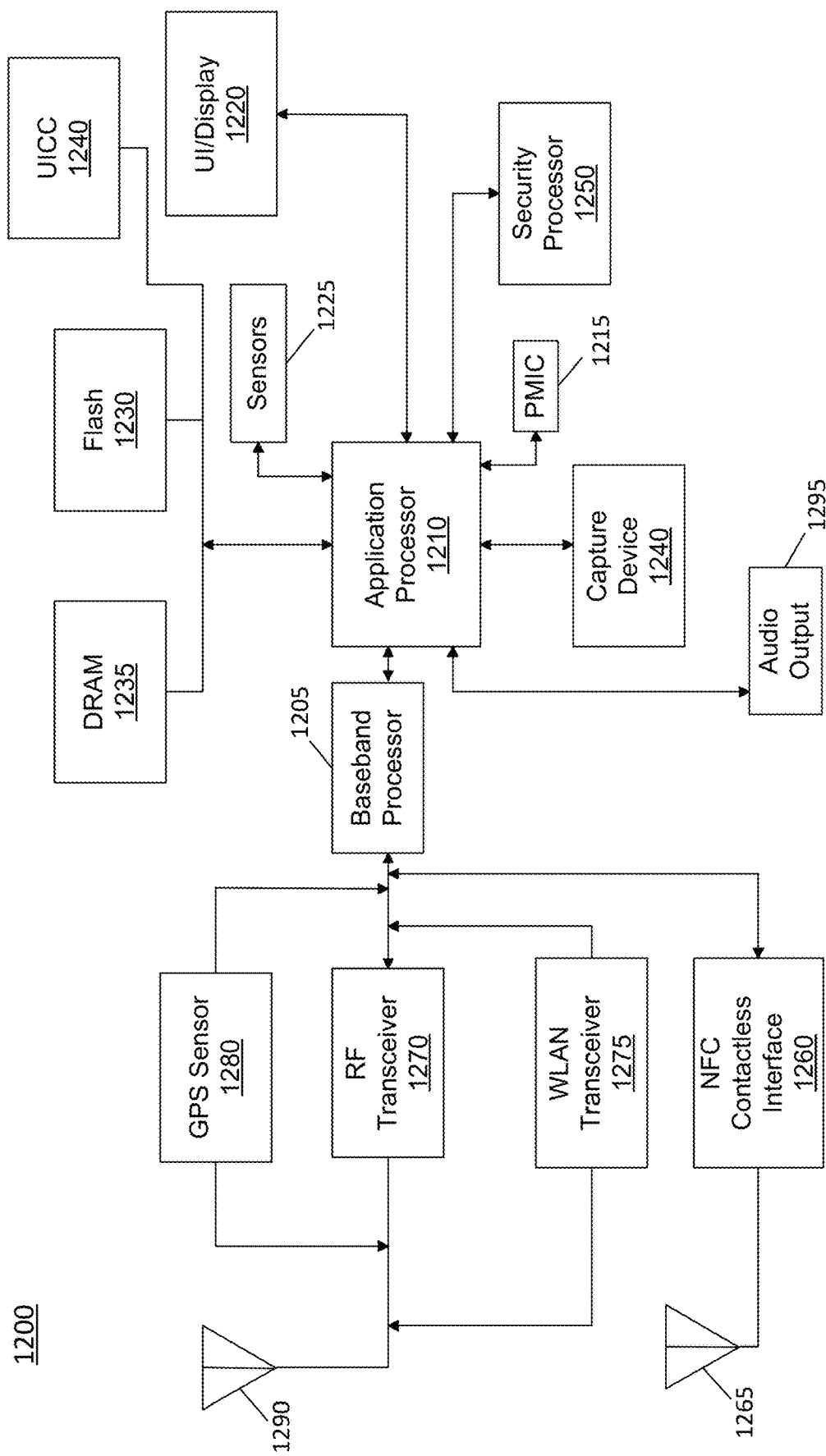
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device and perform the power management techniques described herein.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A PMIC 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
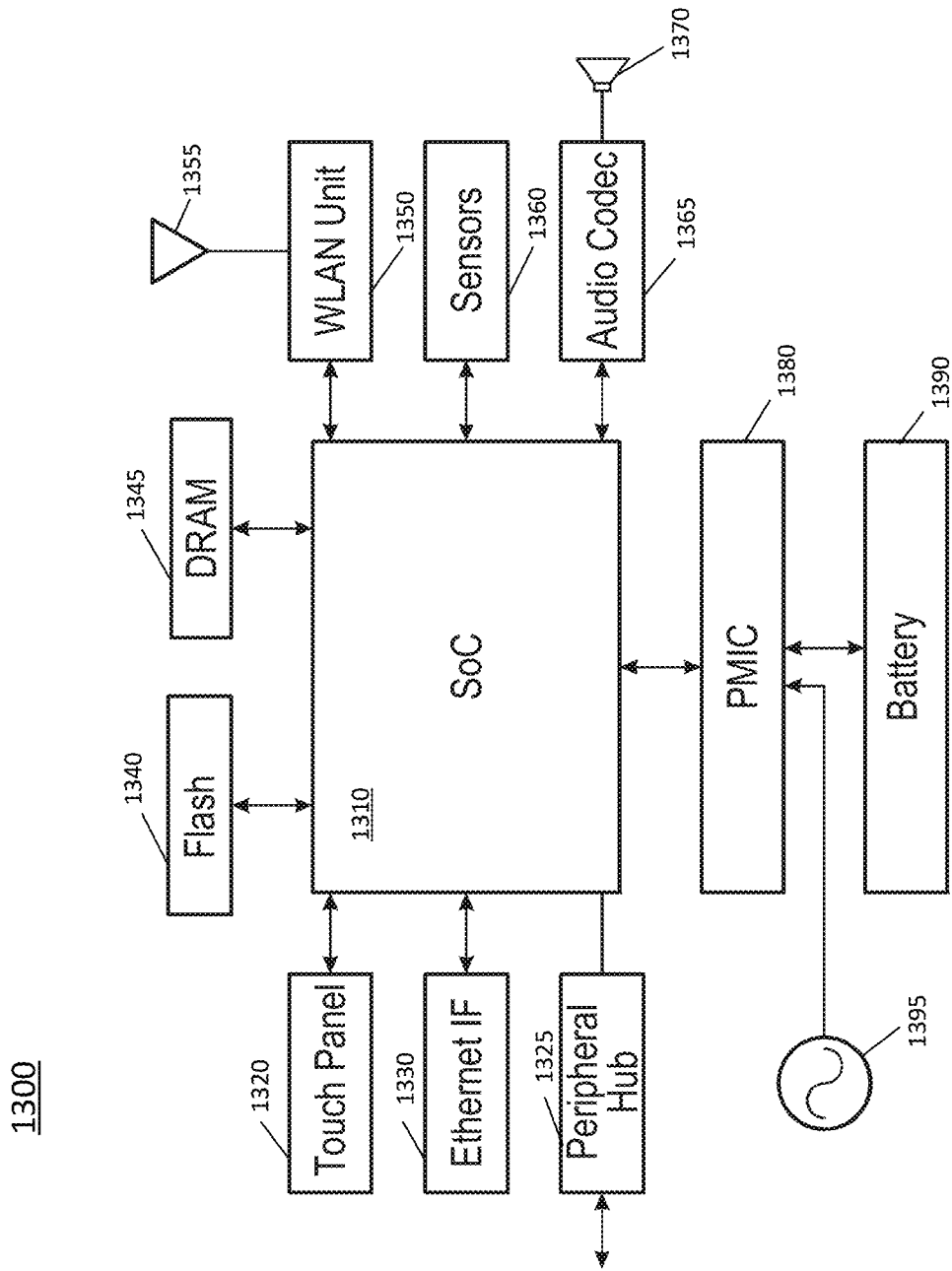
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device and perform the power management techniques described herein.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
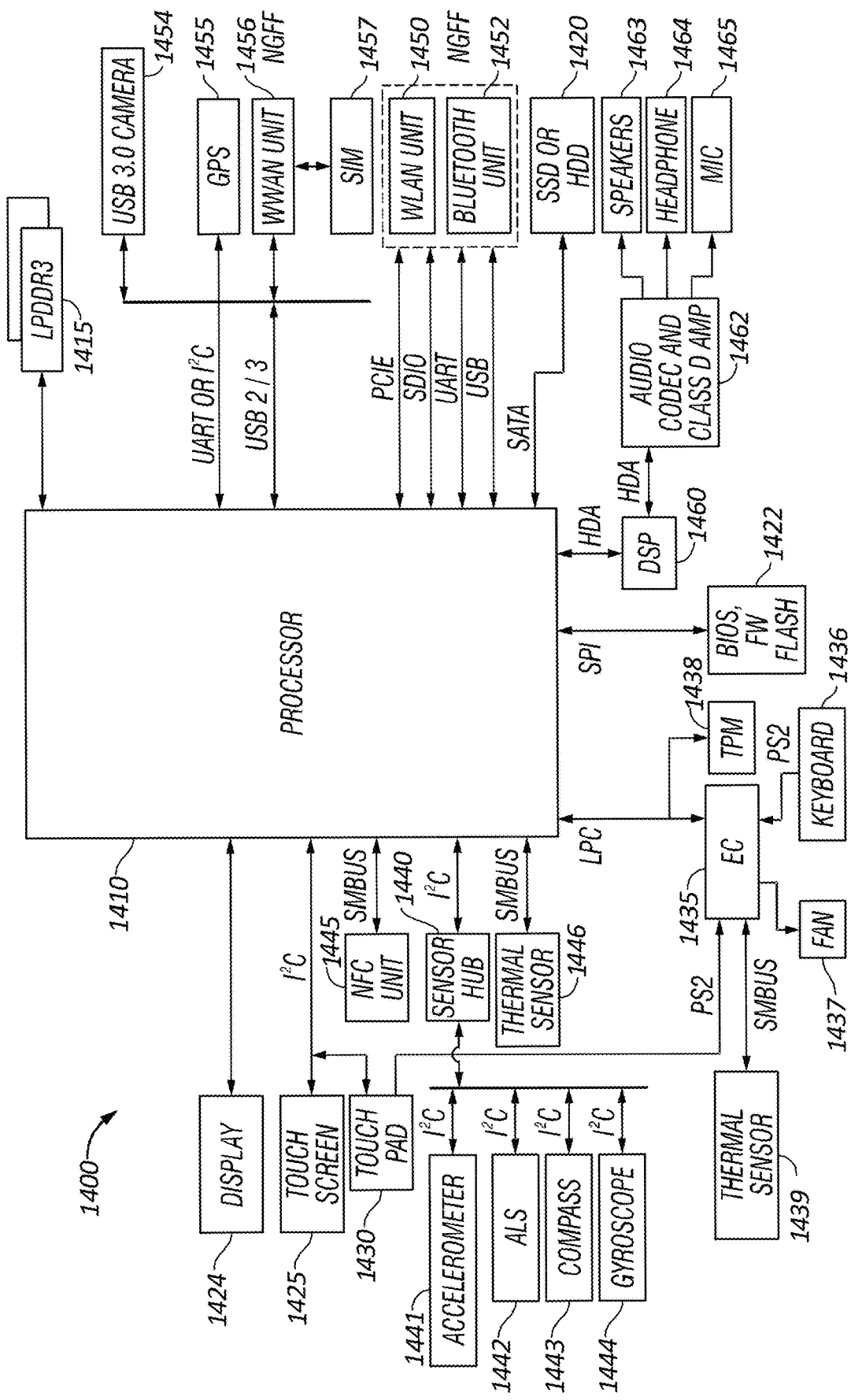
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I$^2$C interconnect. As further shown in FIG. 14, in addition to touch screen 1425, user input by way of touch can also occur via a touch pad 1430 which may be configured within the chassis and may also be coupled to the same I$^2$C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I$_{2C}$ interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
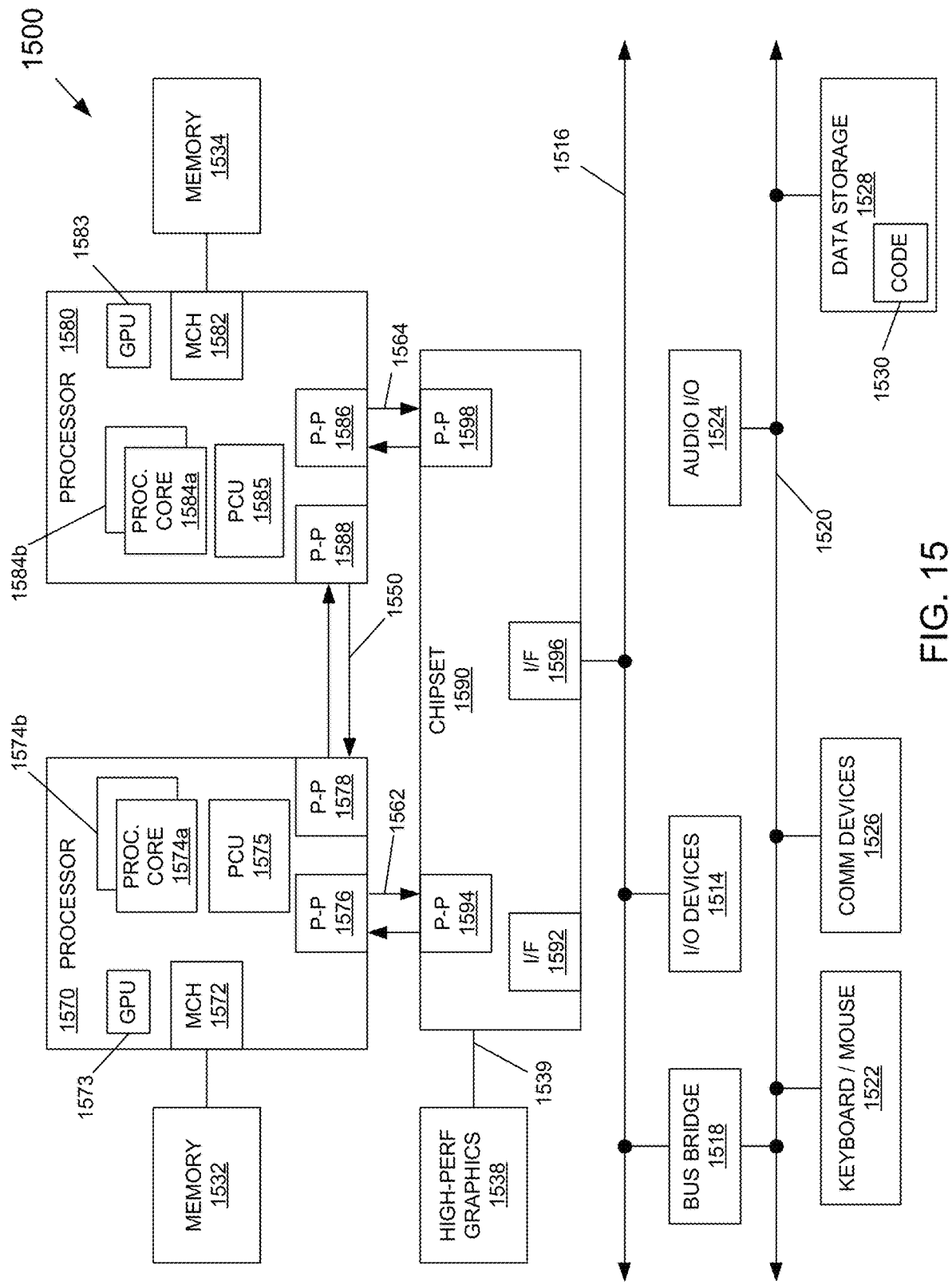
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processors 1574a and 1574b and processor cores 1584a and 1584b), although potentially many more cores may be present in the processors. In addition, each of processors 1570 and 1580 also may include a graphics processor unit (GPU) 1573, 1583 to perform graphics operations. Each of processors 1570 and 1580 can include a PCU 1575, 1585 to perform processor-based power management, including determining presence of a global violation of a power-based budget and communication of an indication of such global violation to local circuitry, including cores 1574, 1584 and/or GPUs 1573, 1583. In turn, the local circuitry may modulate their local throttling based at least in part on the indication of a global violation, as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Figure 16:
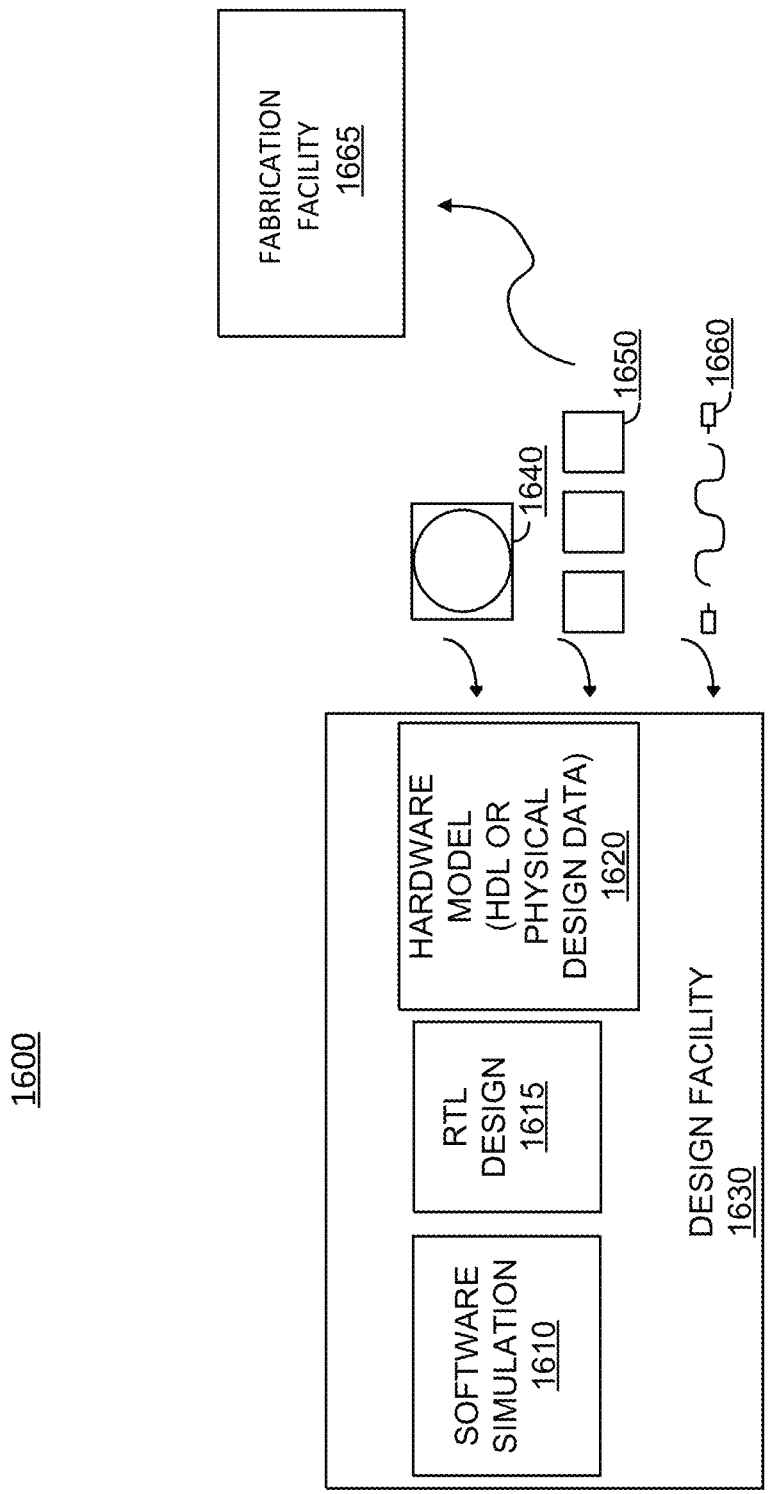
FIG. 16 is a block diagram illustrating an IP core development system used to manufacture an integrated circuit to perform operations according to an embodiment.

FIG. 16 is a block diagram illustrating an IP core development system 1600 that may be used to manufacture an integrated circuit to perform operations according to an embodiment. The IP core development system 1600 may be used to generate modular, re-usable designs that can be incorporated into a larger design or used to construct an entire integrated circuit (e.g., an SoC integrated circuit). A design facility 1630 can generate a software simulation 1610 of an IP core design in a high level programming language (e.g., C/C++). The software simulation 1610 can be used to design, test, and verify the behavior of the IP core. A register transfer level (RTL) design can then be created or synthesized from the simulation model. The RTL design 1615 is an abstraction of the behavior of the integrated circuit that models the flow of digital signals between hardware registers, including the associated logic performed using the modeled digital signals. In addition to an RTL design 1615, lower-level designs at the logic level or transistor level may also be created, designed, or synthesized. Thus, the particular details of the initial design and simulation may vary.

The RTL design 1615 or equivalent may be further synthesized by the design facility into a hardware model 1620, which may be in a hardware description language (HDL), or some other representation of physical design data. The HDL may be further simulated or tested to verify the IP core design. The IP core design can be stored for delivery to a third party fabrication facility 1665 using non-volatile memory 1640 (e.g., hard disk, flash memory, or any non-volatile storage medium). Alternately, the IP core design may be transmitted (e.g., via the Internet) over a wired connection 1650 or wireless connection 1660. The fabrication facility 1665 may then fabricate an integrated circuit that is based at least in part on the IP core design. The fabricated integrated circuit can be configured to perform operations in accordance with at least one embodiment described herein.

Figure 17:
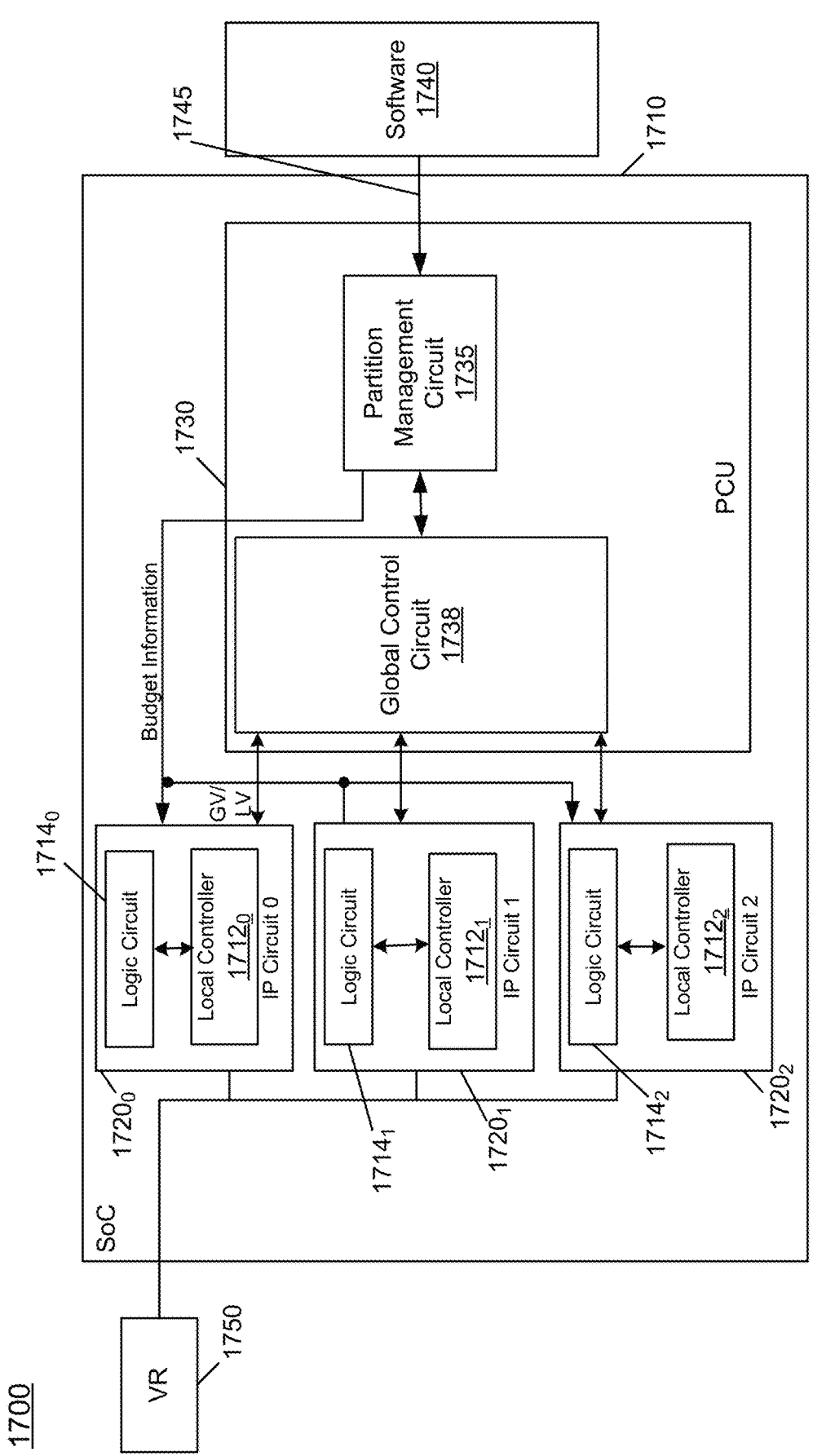
FIG. 17 is a block diagram of a system in accordance with another embodiment of the present invention.

Referring now to FIG. 17, shown is a block diagram of a system in accordance with another embodiment of the present invention. As shown in FIG. 17, system 1700 may be any type of computing system, ranging from small devices such as smartphones, tablet computers or so forth to larger devices including client computing systems and server computing systems.

In any event, system 1700 includes a system on chip (SoC) 1710 that receives at least one voltage from a voltage regulator 1750. In turn, SoC 1710 may include internal power delivery circuitry such as one or more integrated voltage regulators to receive a given voltage from this external voltage source and condition such voltage(s) to provide one or more regulated voltages to circuitry of SoC 1710.

In the illustration of FIG. 17, a plurality of IP circuits $1720_{0-2}$ are shown, although any number of circuits may be present. As examples, IP circuits 1720 may be processing cores that can be implemented, in different embodiments, as a set of homogeneous cores or mixed heterogeneous cores having different capabilities. As shown, each IP circuit 1720 includes a local control circuit $1712_{0-2}$. In embodiments herein, local control circuit 1712 may be configured to receive power delivery information, e.g., in the form one or more of current sensing information, detection information and/or telemetry information regarding operating parameters of IP circuit 1720.

In order to locally control power management of circuitry within IP circuit 1720, local control circuit 1712 may issue requests to a power controller 1720, e.g., in the form of a frequency request, a current request, or a combination request. Such requests may be based on scheduling of a given workload (e.g., of a given virtual machine) to be executed on IP circuit 1720.

In addition, each local control circuit 1712 further may be programmed with a corresponding local current budget. When control circuit 1712 determines that the power delivery information, e.g., sensed current information, exceeds this local current budget, it may perform a throttling of corresponding IP circuit 1720. However in embodiments herein, such local throttle control may be modulated based at least in part on global information received from a power controller 1730. In the embodiment of FIG. 17 power controller 1730 may be implemented as a PCU. In different embodiments, PCU 1730 may be implemented as a dedicated hardware circuit, one of multiple cores, a microcontroller or any other hardware circuitry.

Different types of modulation of local throttling may occur in different embodiments. For example, in one embodiment global conditions may be considered in local throttling by gating of throttling behavior based on a local violation without a corresponding global violation. In another example, a global indication of a global violation may be quantified (e.g., low/medium/high), and the local action is dictated by the level of global violation. Some example actions may include: throttle by half if the global violation is medium level and a local violation is present, or throttle by 25% if the global violation is low and there is a local violation, or always throttle if the global violation is high regardless of local violation. In these ways, improved performance may be realized.

Still with reference to FIG. 17, PCU 1730 includes a control circuit 1735 that is configured to determine a local current budget for each IP circuit 1720 of a given partition (note a processor may include multiple partitions) and provide the same to the IP circuits. In addition, control circuit 1735 also may receive local information from corresponding IP circuits 1720. In various embodiments, this local information may be in the form of requests for voltage, frequency and/or current allocation for a given IP circuit 1720. As another example, the local information may include throttling rate information, e.g., a percentage of time that throttling is active. In an embodiment, PCU 1730 may use this throttling rate information to determine if it should adjust budgets.

In addition, the local information may further include telemetry information about actual operating point of the IP circuit such that control circuit 1735 may provide budget information, e.g., in the form of local current budgets. Such budgets may be allocated based at least in part on hint information received from a software 1740, which may provide workloads for execution. To this end, an interface 1745 may communicate this information from software 1740 to PCU 1730. In different cases, software 1740 may be a firmware, an operating system (e.g., a scheduler of an OS) or other software entity that has an a priori and greater understanding of the nature of workloads to be scheduled.

As further shown in FIG. 17, a global control circuit 1738 may receive a local violation detection signal to indicate that a corresponding IP circuit has exceeded its local limit (e.g. local current budget). In this way, global control circuit 1738 may identify when a global violation occurs. Such global violation occurs when the power consumed by the collection of IP circuits 1720 within a given partition has exceeded the total of the local current budget for each of IP circuits 1712. In other cases, global control circuit 1738 may identify a global violation based on globally monitoring for violations, for example at the voltage regulator. In different implementations, this global violation can be reactive or proactive (effectively predictive).

When it is determined that such global violation has occurred, global control circuit 1738 may issue a global violation detection signal to corresponding IP circuits 1712 in the partition. As described above, in one embodiment the signal acts as a gate, such that in the absence of the global violation detection signal, local throttling is gated and prevented from throttling behavior. Instead when both a local violation is identified within an IP circuit 1712 and a global violation is detected by control circuit 1735, such throttling behavior is enabled.

More particularly as shown in FIG. 17, a logic circuit 1714$_{0-2}$ may be provided in each IP circuit 1720. Logic circuit 1714 may include logic circuitry such as an AND gate, which acts to logically AND local and global violation indications. Stated another way, logic circuit 1714 is configured to qualify a local violation indication with a global violation. Although shown at this high level in the embodiment of FIG. 17, many variations and alternatives are possible.

Figure 18:
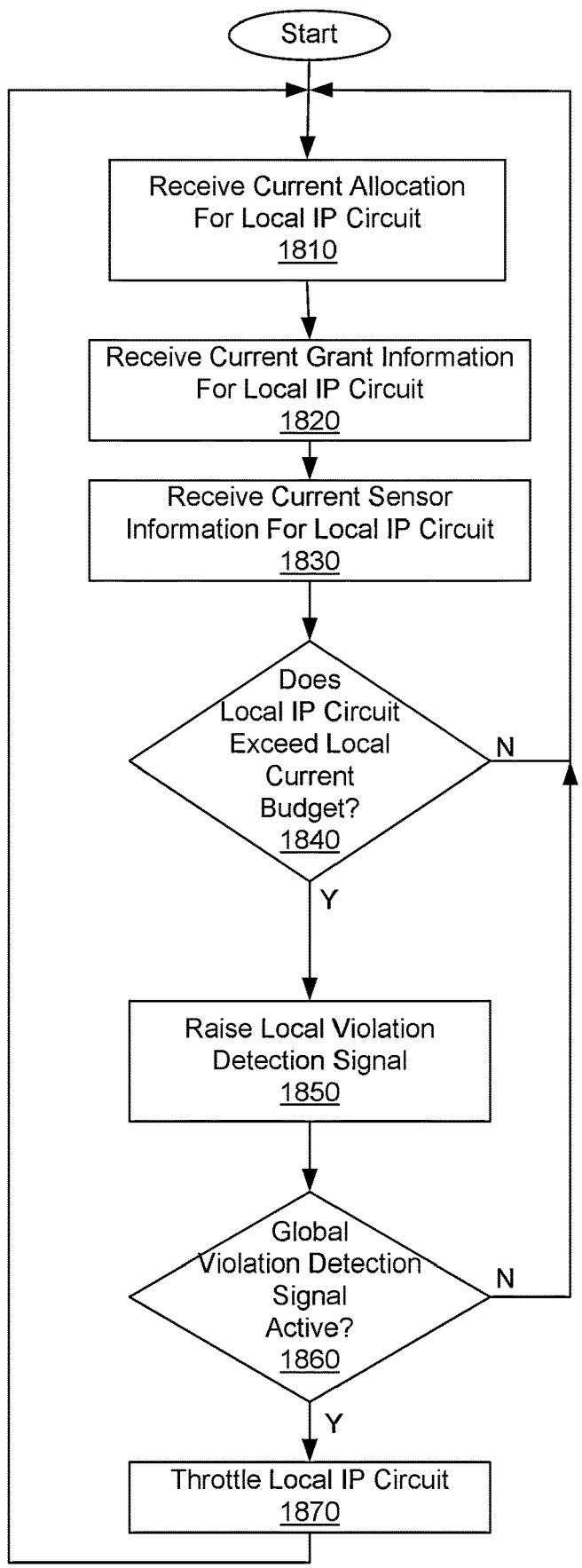
FIG. 18 is a flow diagram of a method in accordance with an embodiment of the present invention.

Referring now to FIG. 18, shown is a flow diagram of a method in accordance with an embodiment of the present invention. As shown in FIG. 18 method 1800 is a method for locally controlling throttling within an IP circuit such as processor core. As such, method 1800 may be performed by control circuitry within the IP circuit, which may be implemented as hardware circuitry, firmware, software and/or combinations thereof.

As illustrated method 1800 begins by issuing a request for a current allocation (block 1810). For example, a local IP circuit may issue a request to operate at a given current and/or frequency level in response to workload scheduling information for a thread, process or other work unit that is to execute in the IP circuit. Next in response to this request, the local control circuit may receive current grant information for the local IP circuit (block 1820). For example, a local control circuit may receive a grant to operate at a given level (and in different embodiments this grant may be for a given frequency, voltage, current or combinations thereof). During operation of the local IP circuit at the granted level, the local control circuit may receive telemetry information, e.g., in the form of current sensor information from one or more sensors internal to IP circuit (block 1830). Or this information may be received from a power delivery circuit such as an IVR associated with the IP circuit. For example, an IVR may provide a high speed measure of actual current consumption. In other examples, this current sensor information may be another type of power delivery information, such as power information.

In any event, control passes from block 1830 to diamond 1840 in which it is determined whether the local IP circuit exceeds its local current budget. To this end, the control circuit may store in a configuration storage such as a configuration register a local current budget, e.g., received from a PCU. If, based at least in part on the received current sensor information it is determined that the local IP circuit does not exceed the local current budget, no further operation occurs in a given iteration of method 1800. And thus control passes back to block 1810, discussed above.

Otherwise, if it is determined that the local IP circuit exceeds its local current budget, control passes from diamond 1840 to block 1850. At block 1850, a local violation detection signal may be raised. For example, the local IP circuit may generate a throttle signal that is sent to further logic circuitry of the local IP circuit. In addition, an indication of the local violation may be sent to the power controller. To this end, the local control circuit may send a signal to the power controller to indicate this exceeding of the local current budget. In other cases, additional or different information may be provided. For example, actual current sensor information itself may be sent some cases.

Still with reference to FIG. 18 it is next determined, e.g., within the further logic circuitry of the local IP circuit, at diamond 1860 whether a global violation detection signal is active. In an embodiment, this logic circuitry may receive such global violation detection signal when a PCU or other global controller identifies a global violation of a global current limit. In this situation, control passes to block 1870 where the local IP circuit is throttled. As an example, this throttling may be effected by gating IP clocks with, e.g., a programmable duty cycle. Another throttle technique may be reducing a frequency of operation of the local IP circuit. Still other throttling techniques such as reducing instruction issuance or so forth in addition or as an alternative also may occur. As another example operation may be throttled by squashing some number of clock signals.

Otherwise at diamond 1860 if it is determined that the global violation detection signal is not active, even when a local violation has been detected, note that no throttling takes place. Instead as further shown in FIG. 18 in this situation no further operations occur within a given iteration of method 1800 and control passes back to block 1810, discussed above. While shown at this high level in the embodiment of FIG. 18, many variations and alternatives are possible.

Figure 19:
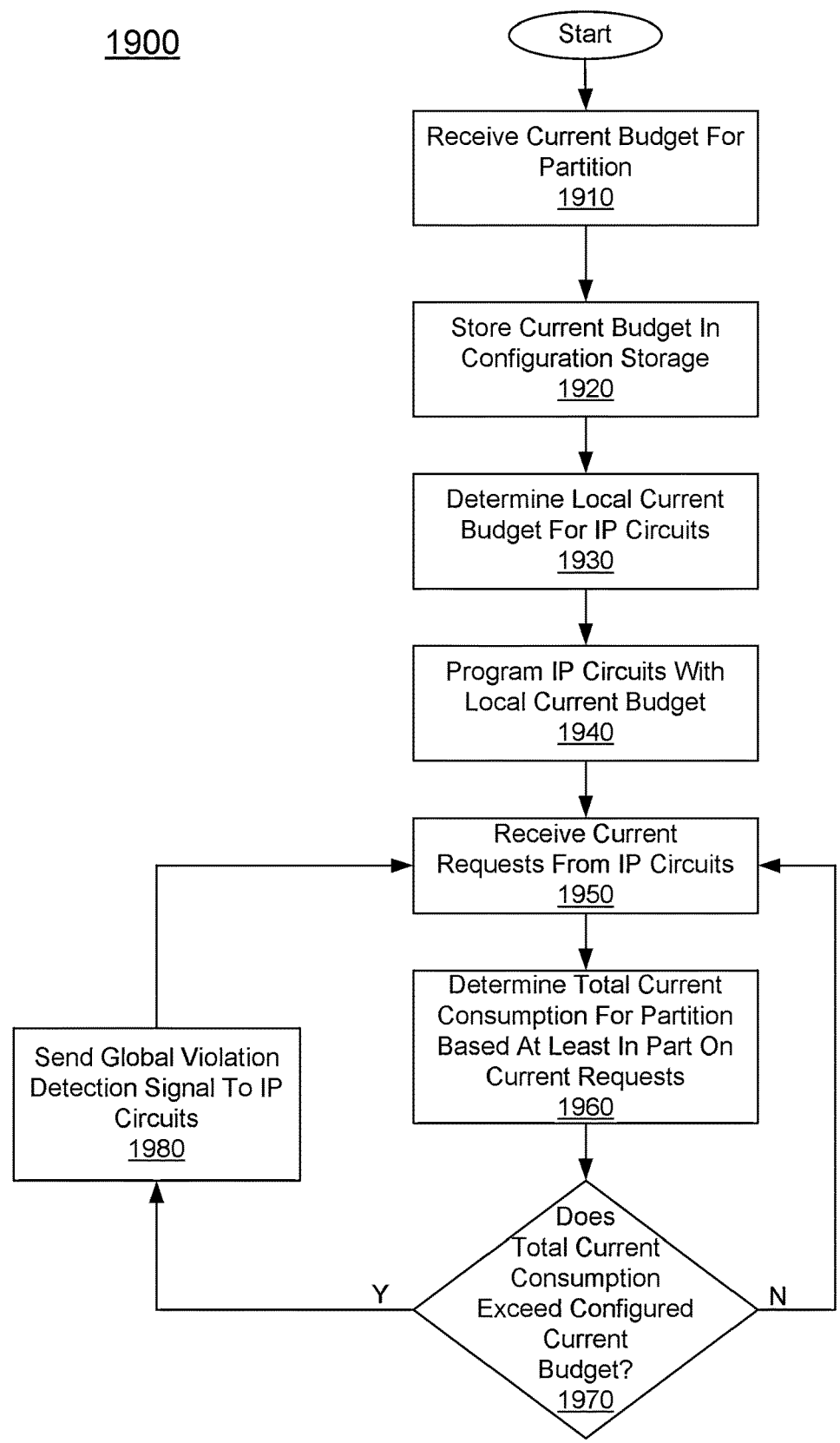
FIG. 19 is a flow diagram of a method in accordance with another embodiment of the present invention.

Referring now to FIG. 19, shown is a flow diagram of a method in accordance with another embodiment of the present invention. As shown in FIG. 19, method 1900 is a method for allocating budgets to at least one partition, identifying global violations, and reporting the same to local circuits. More specifically, method 1900 may be performed in concert between various agents, including software having a workload to be executed and corresponding hardware, including a hardware-based power controller and one or more IP circuits on which at least portions of the workload may execute. As such, method 1900 may be performed by hardware circuitry, firmware, software and/or combinations thereof.

As illustrated, method 1900 begins by receiving a current allocation for a given partition, e.g., a current budget from software, firmware or another entity (block 1910). For example, a PCU may receive this information from a scheduler. In some cases a processor may be configured for single partition operation. In other cases multiple partitions may be present, each having a given portion of a total current budget for the processor. For example, a processor may be configured with 2 partitions, each having one or more cores associated with a given virtual machine. Next at block 1920 the PCU may store this current budget in a configuration storage, e.g., a configuration register included in the PCU. Based at least in part on this information, the PCU may determine a local current budget for the IP circuits in the partition (block 1930). In a representative embodiment, the PCU may determine local current budgets by dividing the received current budget by the number of IP circuits in the partition. In other cases, dynamic workload-based determinations may be made such that each IP circuit of the partition may receive a potentially different current budget based on its individual workload needs.

In any event, control passes from block 1930 to block 1940 where the IP circuit may be programmed with this local current budget. For example, the PCU, in addition to storing these local current budgets in a local configuration storage of the PCU, also may send the local current budgets to each of the IP circuits. In this way, the individual current budgets may be stored, e.g. in a configuration storage of a local control circuit of the IP circuits, for use as described herein. Note at this point, the partition and its included IP circuits are appropriately programmed for normal operation, e.g. for a given boot cycle or dynamically based on changes in workload.

Still referring to FIG. 19, during normal operation the PCU also may receive current requests from the IP circuits (block 1950). Such requests may be based on workloads to be executed in the IP circuits. In some cases, the local IP circuits may send requests for a current grant of a particular level. Or the requests may be in the form of a requested frequency of operation, performance level, or a simple directional hint.

In addition the PCU may receive telemetry information from the IP circuits. In any case in response to such requests, the PCU may determine whether to grant the request. If there is a constraint on operation, the PCU may grant an authorization for a lower level of operation. Control next passes to block 1960 where a total current consumption for the partition may be determined based at least in part on the received requests and/or telemetry information received from the IP circuits. Note that the current consumption of each partition is regulated to its current budget through per-partition EDP control. In turn the total current consumption of all partitions may be determined via the per partition total current consumption levels.

Based at least in part on this total current consumption, it is determined whether this consumption level exceeds the configured current budget (diamond 1970). This configured current budget may be based on a global IccMax threshold. If not, no further operation occurs with regard to this iteration and control passes back to block 1950 for receipt of further current requests. Instead if it is determined that total current consumption of all partitions exceeds the configured global current budget, control passes to block 1980 where a global violation detection signal is sent to the IP circuits. In the absence of this signal, no local throttling may occur even when a local IP circuit detects a local violation. That is, a partition may momentarily exceed its own current budget without penalty so long as the global total current consumption is under the global IccMax threshold. Instead only when it is determined that there is both a local and global violation does a given IP circuit perform throttling as described herein. While shown at this high level in the embodiment of FIG. 19, many variations and alternatives are possible.

Figure 20:
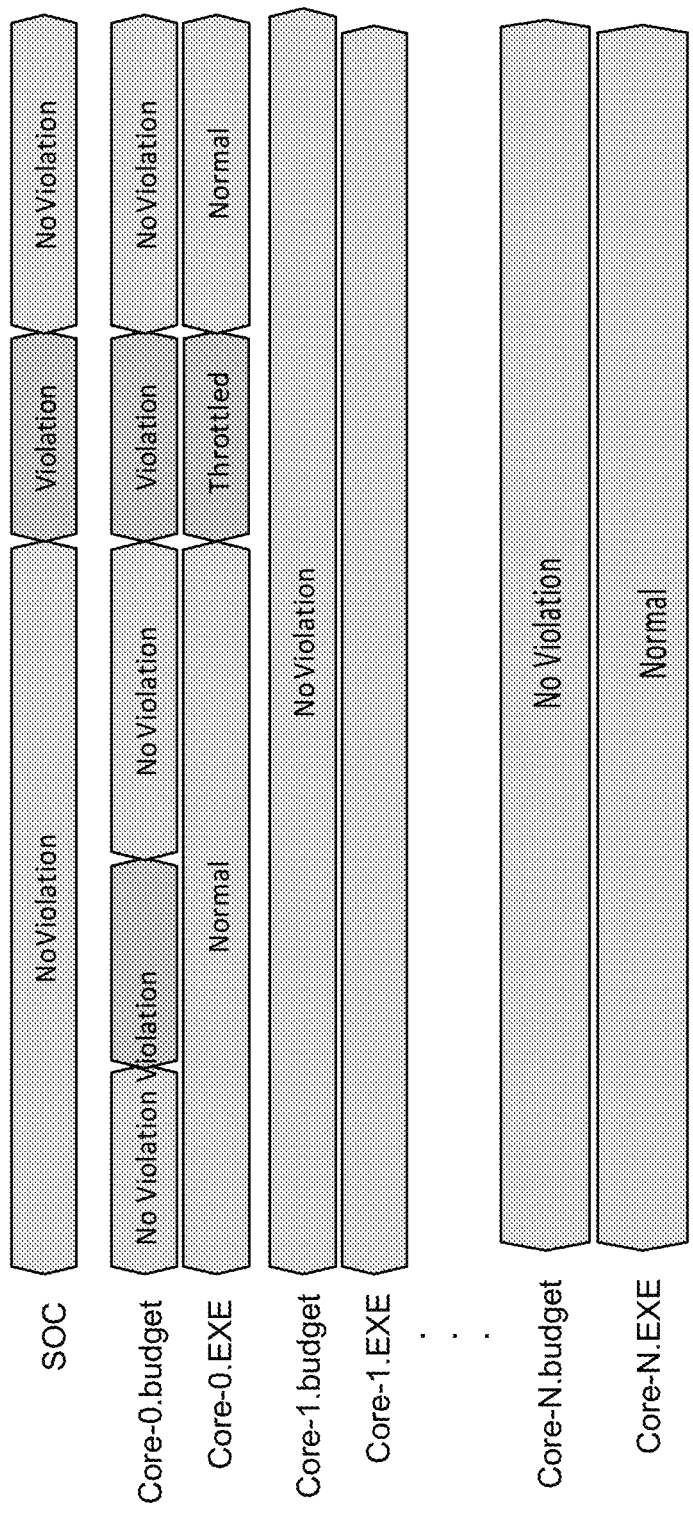
FIG. 20 is a timing diagram illustrating control of a multi-partition processor in accordance with an embodiment.

Referring now to FIG. 20, shown is a timing diagram illustrating control of a multi-partition processor (or SoC) in accordance with an embodiment. As seen in timing diagram 2000, the SoC overall operates in a first time instant without any global violation. Thereafter, a brief global violation occurs and thereafter no global violation again occurs. In turn, multiple cores operate according to local current budgets. As seen cores 1-N never incur a local current budget violation and thus may execute throughout the entire time period without any throttling, even in the time range in which the SoC overall is undergoing a global violation. Instead, only a core 0 that incurs local violations may be throttled, and only when its local violation overlaps with the global violation. Thus as seen in a first time instant in which core 0 suffers a local violation, there is no throttling performed, since the SoC overall is not in a global violation situation. Instead, only when there are concurrent local and global violations occurring does execution in this core become throttled. Understand while shown at this high level in the embodiment of FIG. 20, many variations and alternatives are possible.

As shown in FIG. 20, local conditions are used to target which IP circuit(s) to throttle when a global violation is detected. By doing so, as shown in FIG. 20, a throttle happens when there is a violation to the global budget and only happens to IP circuits that exceed their local budget. In this way, embodiments may enhance performance by not penalizing other IP circuits that are operating in an expected manner, meaning operating within their given budgets.

To effect VM-aware partition management, embodiments may receive, e.g., from a scheduler, information regarding mapping of cores/IP circuits to different partitions at core/IP circuit granularity. For example, in cloud/VM environment, a hypervisor may provide this information. In turn, a global manager such as a partition management circuit 2135 may group IP circuits/cores based on their partition-ID (provided by software). In addition, the global manager may be configured to execute corresponding EDP/RAPL algorithms per partition. This per-partition management ensures that a current budget or power limit for a partition is distributed only between the cores corresponding to that partition. If a core/IP circuit consumes more current/power, these control techniques cause a frequency reduction of cores/IP circuits within a partition to create current or power headroom without affecting frequency of other cores/IP circuits in other partitions.

Note that embodiments may be used to manage other electrical constraints with different time constants such as power limits PL1, PL2, PL3 and PL4, each associated with a different time constant. To this end, embodiments may calculate moving averages for the time constants of these electrical constraints. Embodiments thus take into account both global and local violation indications and use them in an orchestrated way to penalize only an offending IP circuit. In this way, performance loss is minimized upon an occurrence of electrical violation, given the complete IccMax and power limit isolation between multiple partitions in the same SoC.

Figure 21:
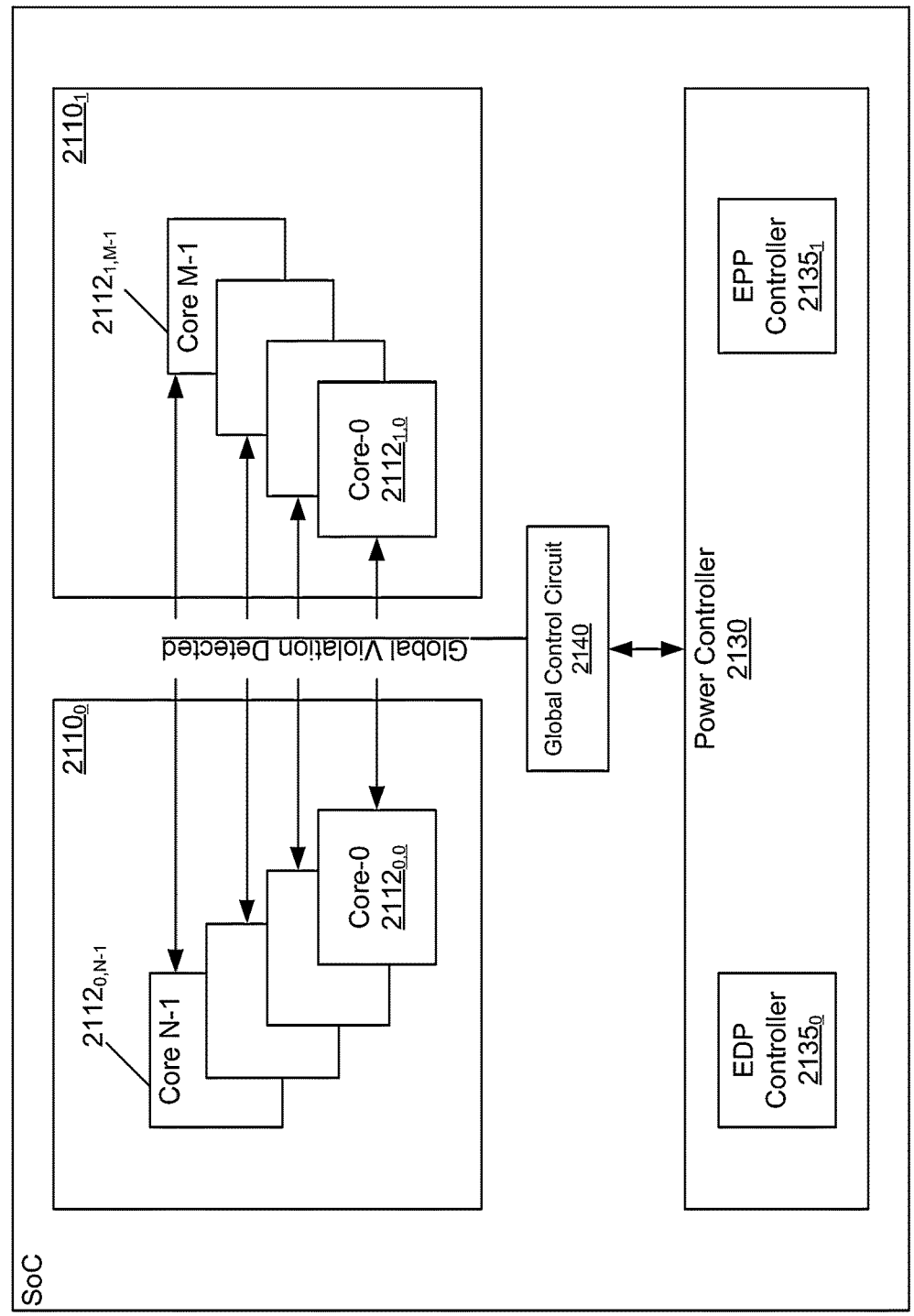
FIG. 21 is a block diagram of a system on chip in accordance with another embodiment of the present invention.

Referring now to FIG. 21, shown is a block diagram of a system on chip in accordance with another embodiment of the present invention. As shown in FIG. 21, SoC 2100 is a multi-partition SoC. As illustrated, a first partition $2110_0$ includes a plurality of cores $2112_{0,0}$-$2112_{0,N-1}$. Similarly, a second partition $2110_1$ includes a plurality of cores $2112_{1,0}$-$2112_{0,M-1}$. Note that the cores of the different partitions may be heterogeneous. For example, one set of cores may be in-order cores and one set of cores may be out-of-order cores. As another example, one set of cores may be general-purpose processing cores and another set of cores may be graphics processing cores. And of course there may be more than 2 partitions in other implementations.

In operation, power consumption of these different partitions and included cores may be controlled by a power controller 2130. In various embodiments, power controller 2130 may be implemented as a PCU, as described above. As seen, power controller 2130 may be configured with multiple independent EDP controllers $2135_{0,1}$, each associated with a given partition. Such controllers may determine appropriate ceiling frequency for the corresponding cores of the different partitions in an independent manner, such that there is no cross-partition frequency degradation.

As further illustrated in FIG. 21, SoC 2100 also includes a global control circuit 2140. Although shown as a separate circuit in the embodiment of FIG. 21 understand that in other implementations, global control circuit 2140 may be implemented within power controller 2130. In any event, global control circuit 2140 may, based at least in part on budget information received from power controller 2130 and, e.g., telemetry information received from cores of partitions 2110, identify a global violation. In response to detection of such global violation, a global violation detected signal may be sent to corresponding cores 2112. In turn, logic circuitry within such cores may be configured to cause a throttling of the corresponding core when a local violation is incurred and is undergoing concurrently with this global violation. Otherwise such logic circuitry may be configured to gate any throttling when a local violation is detected. Understand while shown at this high level in the embodiment of FIG. 21, many variations and alternatives are possible.

The following examples pertain to further embodiments.

In one example, a processor includes: a plurality of IP circuits, each to execute instructions and including a local control circuit to enable the IP circuit to operate at a level above a local current budget for the IP circuit, unless the processor is undergoing a global violation; and a power controller coupled to the plurality of IP circuits and including a control circuit to receive request information from the plurality of IP circuits and, based at least in part on the request information, determine that the processor is undergoing the global violation when a global current budget is exceeded.

In an example, a first IP circuit of the plurality of IP circuits further comprises a first logic circuit to receive a throttle signal from the local control circuit and prevent the first IP circuit from being throttled in absence of the global violation.

In an example, the first logic circuit is to receive a global violation signal from the power controller when the processor is undergoing the global violation, where the first logic circuit is to cause the first IP circuit to be throttled in response to the throttle signal and the global violation signal.

In an example, a second IP circuit of the plurality of IP circuits comprises a second logic circuit to receive the global violation signal and prevent the second logic circuit from being throttled while the first IP circuit is throttled.

In an example, in response to the global violation signal and without receipt of the throttle signal, the first logic circuit is to prevent the first IP circuit from being throttled.

In an example, the local control circuit is to generate the throttle signal when a current consumption of the first IP circuit exceeds a local current budget for the first IP circuit.

In an example, the processor comprises a first partition including at least one first IP circuit and a second partition including at least one second IP circuit, where the power controller is to allocate a first current budget to the first partition and allocate a second current budget to the second partition, where the first partition is to execute a first virtual machine and the second partition is to execute a second virtual machine.

In an example, when the first partition exceeds the first current budget, the at least one second IP circuit is to operate without constraint.

In an example, the power controller further comprises a partition management circuit to allocate the first current budget to the first partition and allocate the second current budget to the second partition.

In an example, when the first partition is undergoing the global violation, the partition management circuit is to cause the second partition to operate without constraint.

In an example, when the first partition is undergoing the global violation and the second partition is not undergoing the global violation, the power controller is to issue a global violation signal to the first partition but not to the second partition.

In an example, in response to the global violation signal and a local violation, the at least one first IP circuit is to be throttled.

In another example, a method comprises: determining, in a local control circuit of a first IP circuit of a processor, whether a current consumption of the first IP circuit exceeds a local current budget for the first IP circuit; raising a throttle signal in response to determining that the current consumption exceeds the local current budget; and preventing the first IP circuit from being throttled in response to the throttle signal unless the processor is undergoing a global violation of a global current budget for the processor.

In an example, the method further comprises throttling the first IP circuit in response to the throttle signal and a global violation signal indicative of the processor undergoing the global violation.

In an example, the method further comprises while the first IP circuit is throttled in response to the current consumption of the first IP circuit exceeding the local current budget and the global violation signal, preventing a second IP circuit of the processor from being throttled, where a current consumption of the second IP circuit does not exceed a local current budget for the second IP circuit.

In an example, the global current budget is for a first partition of the processor and while the first IP circuit is throttled in response to the current consumption of the first IP circuit exceeding the local current budget, enabling a second partition of the processor to operate without throttling when the second partition is not undergoing a global violation of a global current budget for the second partition.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In yet another example, a system includes a SoC and a voltage regulator coupled to the SoC to provide one or more voltages to the SoC. The SoC may include: a first partition comprising a first plurality of cores; a second partition comprising a second plurality of cores; and a power controller. In turn, the power controller may include: a partition management circuit to allocate a first budget to the first partition and allocate a second budget to the second partition; and a global control circuit to identify a first global violation in response to the first partition exceeding the first budget and identify a second global violation in response to the second partition exceeding the second budget. In response to the first global violation at least one of the first plurality of cores having a consumption level exceeding a local budget is to be throttled, while the second partition is to operate unconstrained.

In an example, the at least one of the first plurality of cores comprises a logic circuit to receive a local violation signal in response to the consumption level exceeding the local budget and a global violation signal in response to the first global violation, and cause the at least one of the first plurality of cores to be throttled in response to the local violation signal and the global violation signal.

In an example, the logic circuit is to prevent the at least one of the first plurality of cores from being throttled in absence of the global violation signal.

In an example, the power controller, in response to the first global violation, is to prevent cross-partition throttling of the second partition.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a plurality of processing circuits to execute instructions; and
   a global control circuit to assert a global violation signal to the plurality of processing circuits in response to a determination that a combined power consumption of the plurality of processing circuits has exceeded a global current budget,
   wherein each processing circuit of the plurality of processing circuits includes a local control circuit to, in response to a determination that a power consumption of the each processing circuit has exceeded a local current budget allocated to the each processing circuit, enable the each processing circuit to exceed the local current budget allocated to the each processing circuit unless the global violation signal is asserted.

2. The processor of claim 1, wherein the local control circuit is further to:
   in response to the determination that the local current budget for the processing circuit has been exceeded, throttle the processing circuit while the global violation signal is asserted.

3. The processor of claim 1, wherein the local control circuit is further to:
   in response to the determination that the local current budget for the processing circuit has been exceeded, prevent the processing circuit from being throttled while the global violation signal is unasserted.

4. The processor of claim 1, wherein the local control circuit is further to:
   assert a local violation signal in response to the determination that the local current budget for the processing circuit has been exceeded, wherein the local violation signal is sent from the local control circuit to the global control circuit.

5. The processor of claim 4, wherein the global control circuit is further to:
   receive the local violation signal from the local control circuit in at least one processing circuit; and
   generate the global violation signal after receiving the local violation signal from the local control circuit in the at least one processing circuit.

6. The processor of claim 1, wherein the global control circuit is included in a power controller of the processor.

7. The processor of claim 6, wherein the plurality of processing circuits are divided into at least a first partition and a second partition, wherein the power controller is to allocate a first current budget to the first partition and allocate a second current budget to the second partition.

8. A non-transitory machine-readable medium having stored thereon instructions executable to:
   determine, by a local control circuit of a first processing circuit of a processor, whether a current consumption of the first processing circuit exceeds a local current budget allocated to the first processing circuit, wherein the processor comprises a plurality of processing circuits;
   determine, by the local control circuit, whether a global violation signal is currently asserted to indicate that a combined power consumption of the plurality of processing circuits currently exceeds a global current budget; and
   in response to a determination that the current consumption of the first processing circuit exceeds the local current budget and the global violation signal is not currently asserted, enable the processing circuit to exceed the local current budget.

9. The machine-readable medium of claim 8, including instructions executable to:
   in response to the determination that the local current budget for the first processing circuit has been exceeded, the local control circuit throttling the first processing circuit while the global violation signal is currently asserted.

10. The machine-readable medium of claim 8, including instructions executable to:
in response to the determination that the local current budget for the first processing circuit has been exceeded, the local control circuit preventing throttling of the first processing circuit while the global violation signal is unasserted.

11. The machine-readable medium of claim 8, wherein the global violation signal is asserted by a global control circuit included in the processor.

12. The machine-readable medium of claim 11, including instructions executable to:
the local control circuit asserting a local violation signal in response to the determination that the local current budget for the first processing circuit has been exceeded, wherein the local violation signal is sent from the local control circuit to the global control circuit.

13. The machine-readable medium of claim 11, wherein the global control circuit is included in a power controller of the processor.

14. The machine-readable medium of claim 13, wherein the plurality of processing circuits are divided into at least a first partition and a second partition, wherein the power controller is to allocate a first current budget to the first partition and allocate a second current budget to the second partition.

15. A system comprising:
a system on chip (SoC) comprising:
a plurality of processing circuits to execute instructions; and
a global control circuit to assert a global violation signal to the plurality of processing circuits in response to a determination that a combined power consumption of the plurality of processing circuits has exceeded a global current budget,
wherein each processing circuit of the plurality of processing circuits includes a local control circuit to, in response to a determination that a power consumption of the each processing circuit has exceeded a local current budget allocated to the each processing circuit:
enable the each processing circuit to operate above the local current budget when the global violation signal is absent; and
throttle the each processing circuit when the global violation signal is asserted.

16. The system of claim 15, wherein the local control circuit is further to:
in response to the determination that the local current budget for the processing circuit has been exceeded, prevent the processing circuit from being throttled while the global violation signal is unasserted.

17. The system of claim 15, wherein the local control circuit is further to:
assert a local violation signal in response to the determination that the local current budget for the processing circuit has been exceeded, wherein the local violation signal is sent from the local control circuit to the global control circuit.

18. The system of claim 17, wherein the global control circuit is further to:
receive the local violation signal from the local control circuit in at least one processing circuit; and
generate the global violation signal after receiving the local violation signal from the local control circuit in the at least one processing circuit.

19. The system of claim 15, wherein the global control circuit is included in a power controller of the processor.

20. The system of claim 19, wherein the plurality of processing circuits are divided into at least a first partition and a second partition, wherein the power controller is to allocate a first current budget to the first partition and allocate a second current budget to the second partition.

* * * * *